Dec. 10, 1963 H. F. WILDER 3,114,003

SELF-REGULATING TWO-CHANNEL TIME DIVISION TELEGRAPH SYSTEM

Filed Sept. 1, 1959 18 Sheets-Sheet 1

INVENTOR.
H. F. WILDER
BY J. B. Burke
ATTORNEY

Dec. 10, 1963 H. F. WILDER 3,114,003

SELF-REGULATING TWO-CHANNEL TIME DIVISION TELEGRAPH SYSTEM

Filed Sept. 1, 1959 18 Sheets-Sheet 2

SOLID LINE: SUM OF E1 AND E4
DASHED LINE: SUM OF E3 AND E6

SELF-REGULATING TWO-CHANNEL TIME DIVISION TELEGRAPH SYSTEM

Filed Sept. 1, 1959 18 Sheets-Sheet 7

Dec. 10, 1963 H. F. WILDER 3,114,003

SELF-REGULATING TWO-CHANNEL TIME DIVISION TELEGRAPH SYSTEM

Filed Sept. 1, 1959 18 Sheets-Sheet 8

Dec. 10, 1963 H. F. WILDER 3,114,003

SELF-REGULATING TWO-CHANNEL TIME DIVISION TELEGRAPH SYSTEM

Filed Sept. 1, 1959 18 Sheets-Sheet 10

Dec. 10, 1963 H. F. WILDER 3,114,003

SELF-REGULATING TWO-CHANNEL TIME DIVISION TELEGRAPH SYSTEM

Filed Sept. 1, 1959 18 Sheets-Sheet 11

Dec. 10, 1963 H. F. WILDER 3,114,003

SELF-REGULATING TWO-CHANNEL TIME DIVISION TELEGRAPH SYSTEM

Filed Sept. 1, 1959 18 Sheets-Sheet 13

Dec. 10, 1963 H. F. WILDER 3,114,003

SELF-REGULATING TWO-CHANNEL TIME DIVISION TELEGRAPH SYSTEM

Filed Sept. 1, 1959 18 Sheets-Sheet 16

SELF-REGULATING TWO-CHANNEL TIME DIVISION TELEGRAPH SYSTEM

Filed Sept. 1, 1959

3,114,003
SELF-REGULATING TWO-CHANNEL TIME DIVISION TELEGRAPH SYSTEM

Harold F. Wilder, Wyckoff, N.J., assignor to The Western Union Telegraph Company, New York, N.Y., a corporation of New York Filed Sept. 1, 1959, Ser. No. 837,499
6 Claims. (Cl. 178—50)

This invention concerns an unattended, self-regulating time division multiplex telegraph system capable of transmitting over a single narrow-band carrier channel two independent message channels.

At the transmitting or sending terminal of this system the intelligence pulses of the message characters are transmitted in discrete bursts of about one minute duration. Each burst of transmission is preceded by a rest period during which a number of impulses are transmitted to the receiving station. The receiving station aligns its signal regenerative circuitry upon this alignment signal before restoring each of its multiplex channels to a condition for receiving message traffic signals from the transmitting terminal.

It has been known heretofore in diplex telegraph systems to precede each pair of characters sent with a common start pulse and add a rest pulse at their conclusion. In the present system by contrast several hundreds of characters are transmitted in each burst of transmission, with the bursts preceded by alignment or synchronizing signals.

The system further provides unique means for utilizing the alignment signals by providing ranging circuitry which insures that the scanning of the alignment signals is effected when their time function is maximum and the signal impulses are least susceptible to distortion and electrical noise effects.

It is a principal object of the invention to provide a system in which all transmitting, receiving, and aligning operations are done automatically so that neither initially nor during course of use is the attention of testing and regulating personnel required.

It is a further object to provide a telegraph system in which operations of circuit lineup, channel phasing, and ranging are done automatically rather than manually.

It is another object to provide an unattended self-regulating, time division telegraph multiplex system.

A further object is to provide a telegraph system in which traffic transmission is separated into periodic bursts of predetermined numbers of characters, the length of time of transmission being sufficiently short to make it possible to use free running oscillators as standard frequency sources at sending and receiving terminals and to avoid the necessity of phase correction means at the receiving terminal.

A further object is employment in a telegraph system of an automatic signal ranging circuit which scans incoming signals at a receiving terminal at their center of time duration when they are least susceptible to signal bias and distortion.

A further object is provision of a ranging circuit which operates as an electronic clutch.

Other and further objects and advantages of the invention will become apparent from the following description taken together with the drawings, wherein:

FIGS. 1 and 2 taken together constitute a diagram of a signal sending terminal employed in the system;

Figures 4, 18, 19:
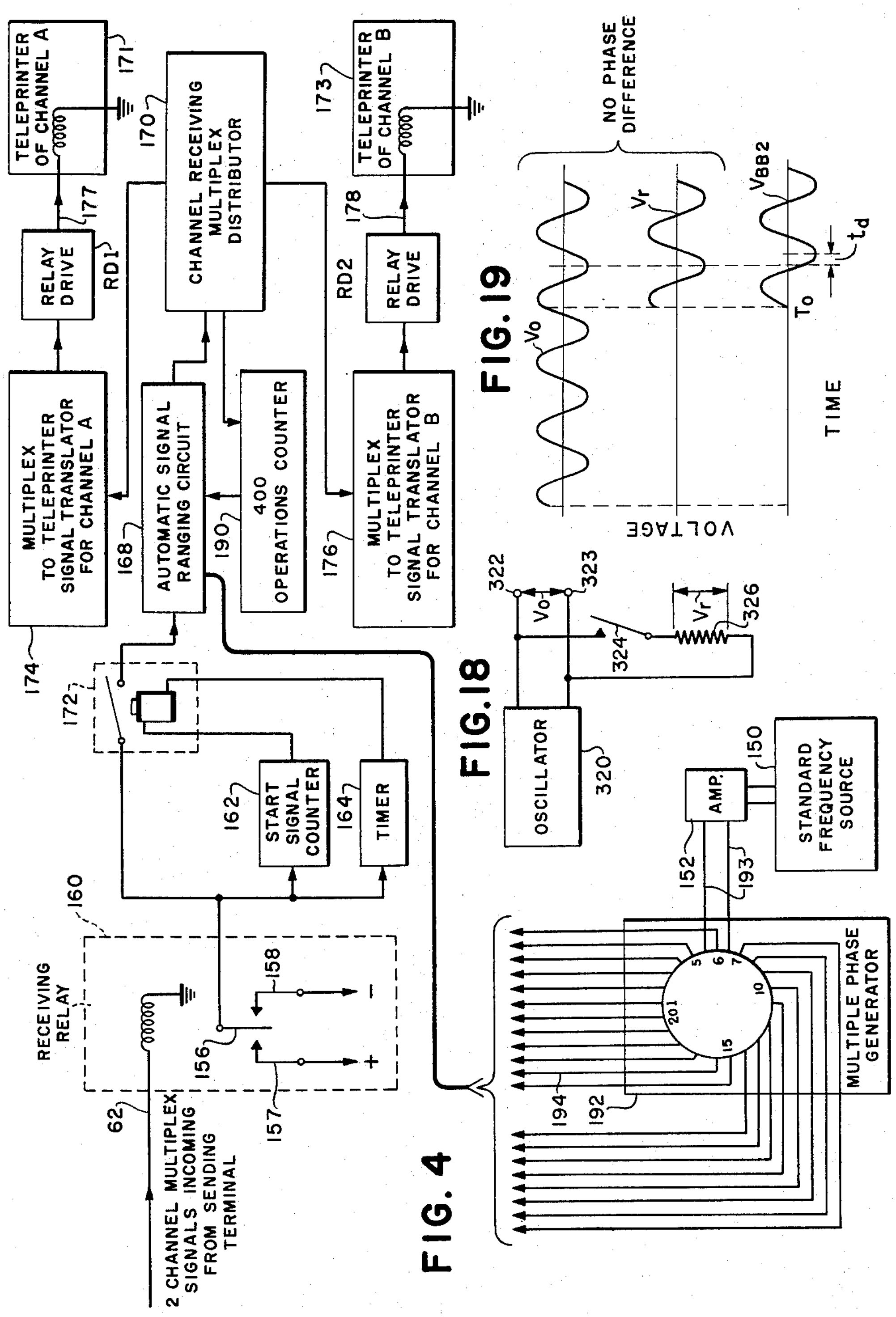
FIG. 4 is a block diagram of a receiving terminal employed in the system.
Figure 13:
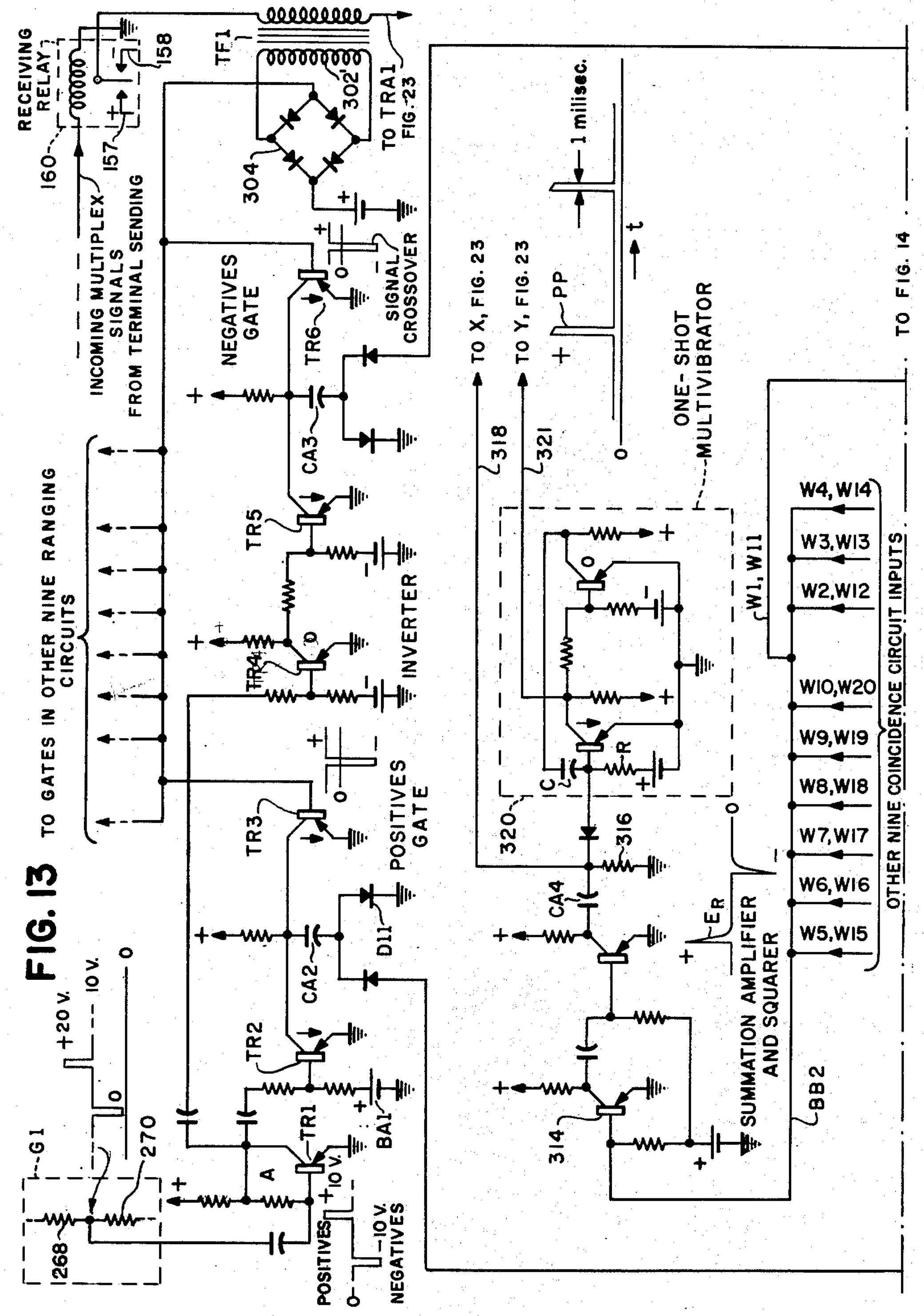
Figure 14:
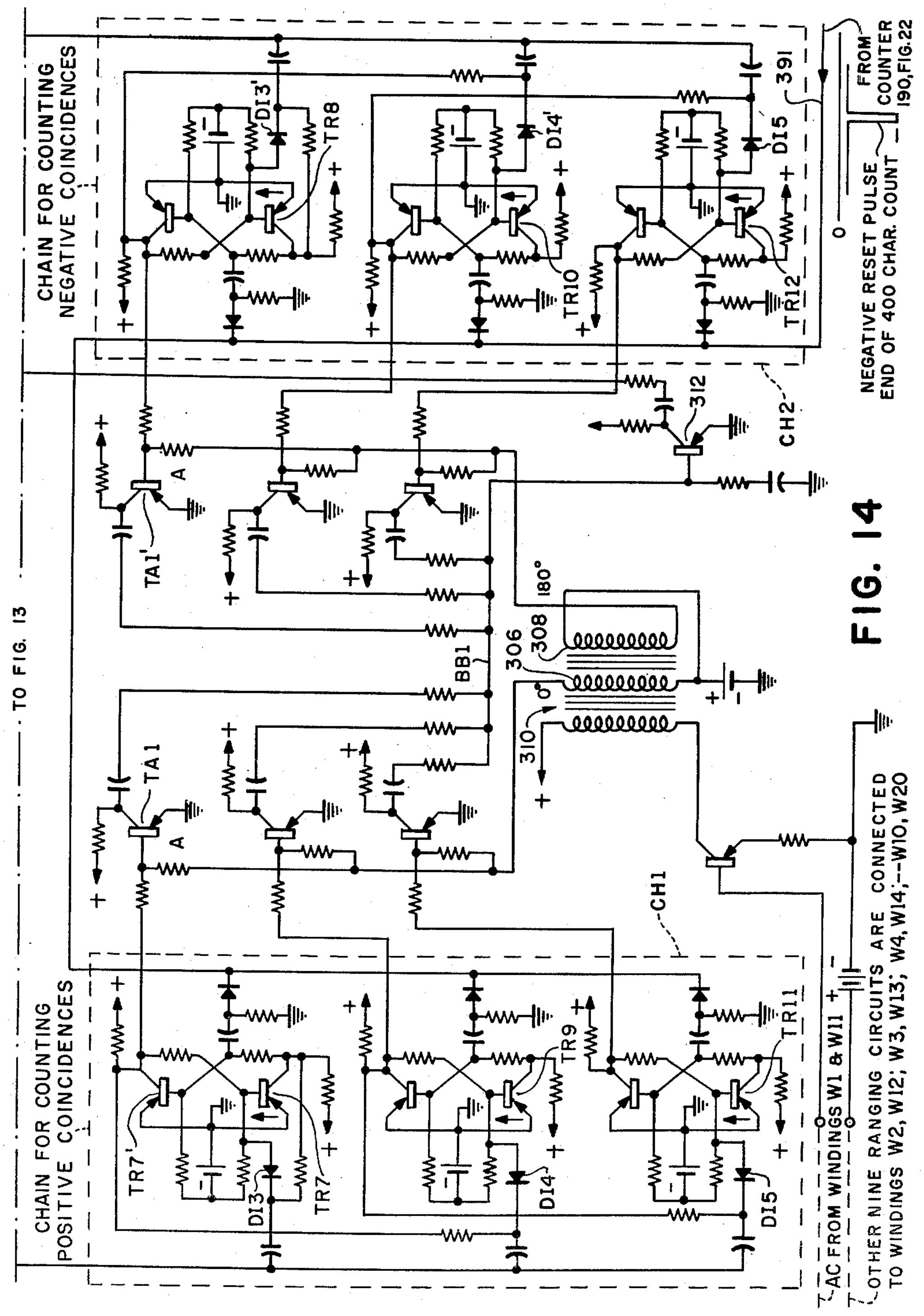
Figure 20:
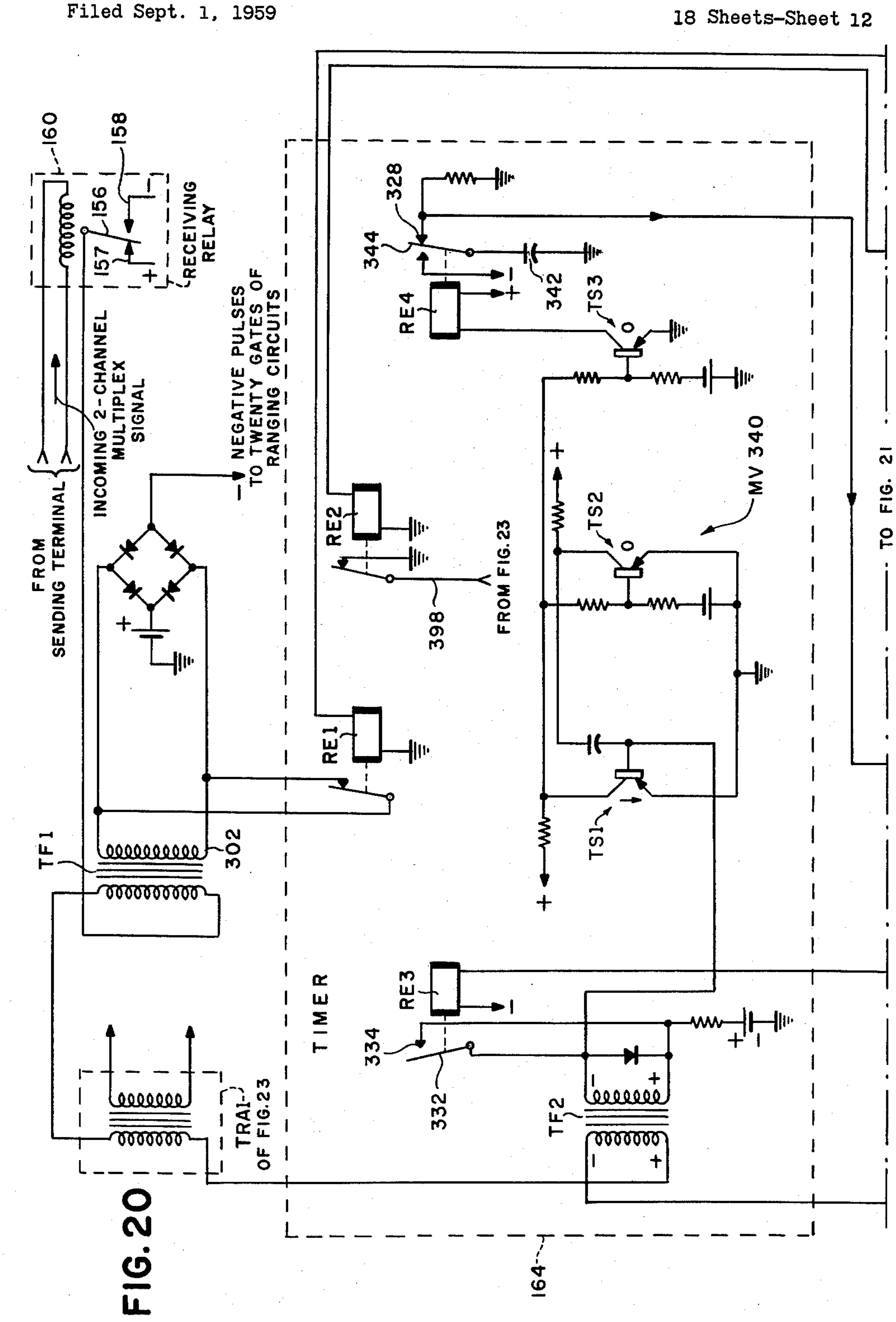
Figure 21:
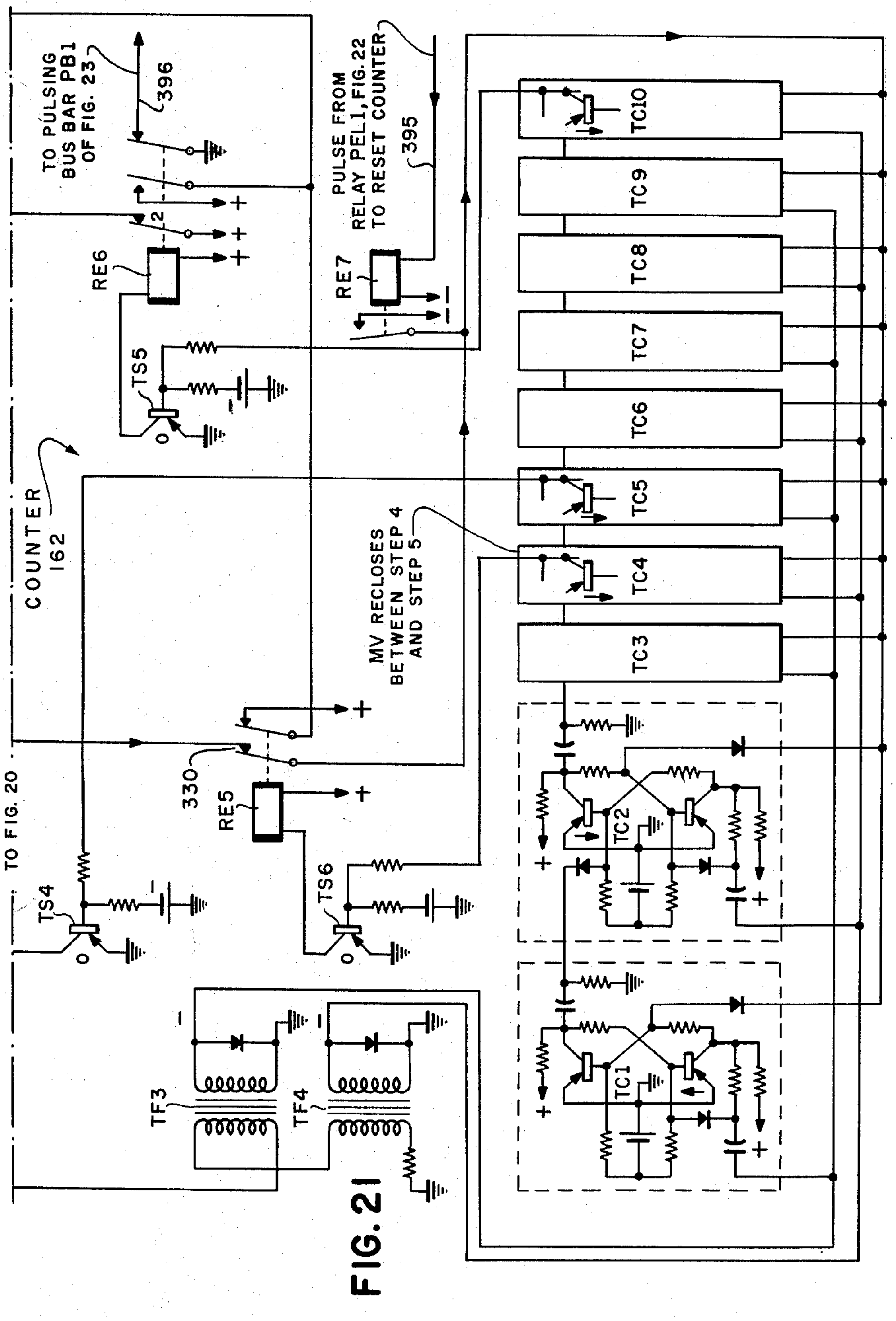
Figure 22:
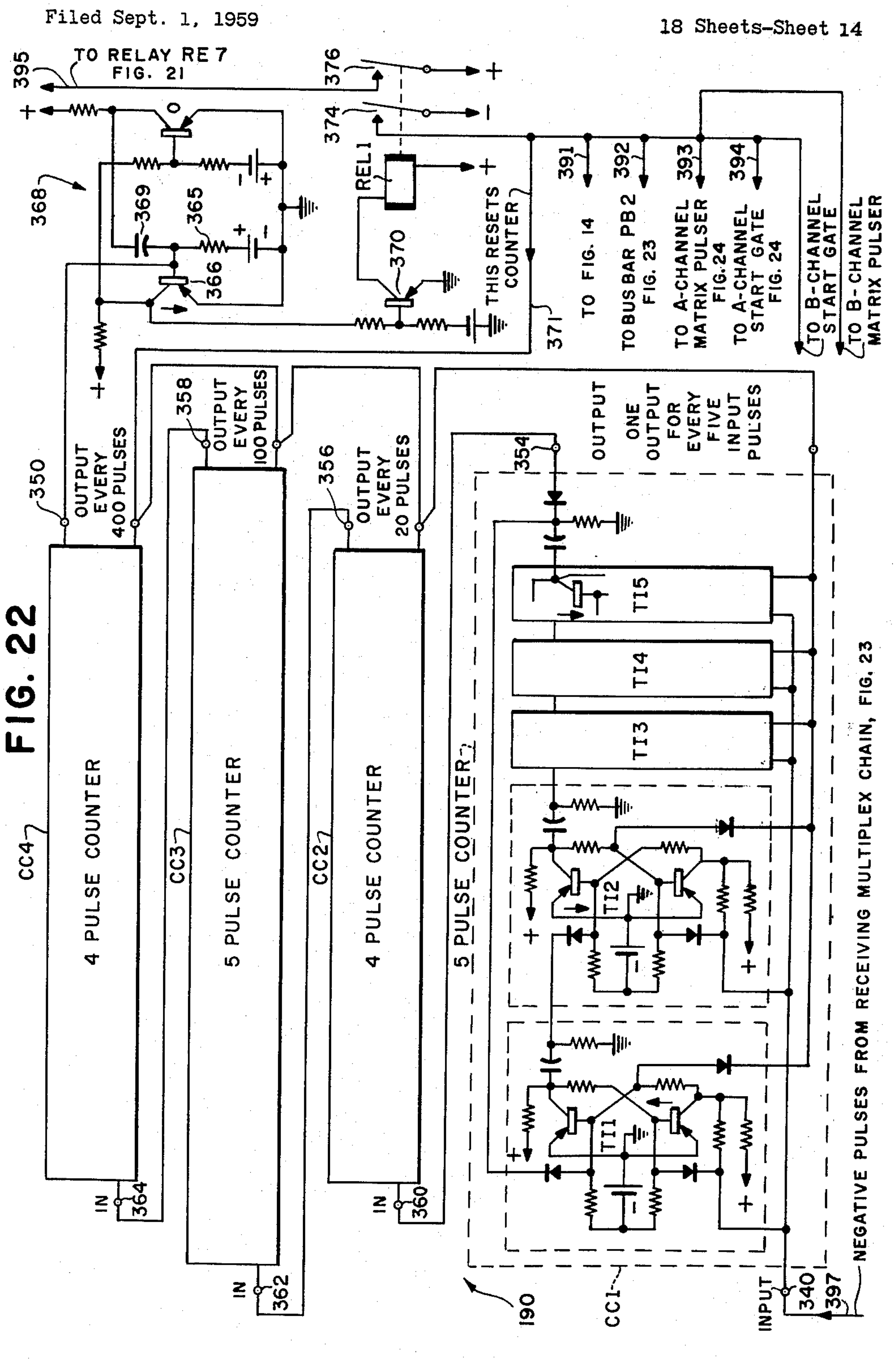
Figure 23:
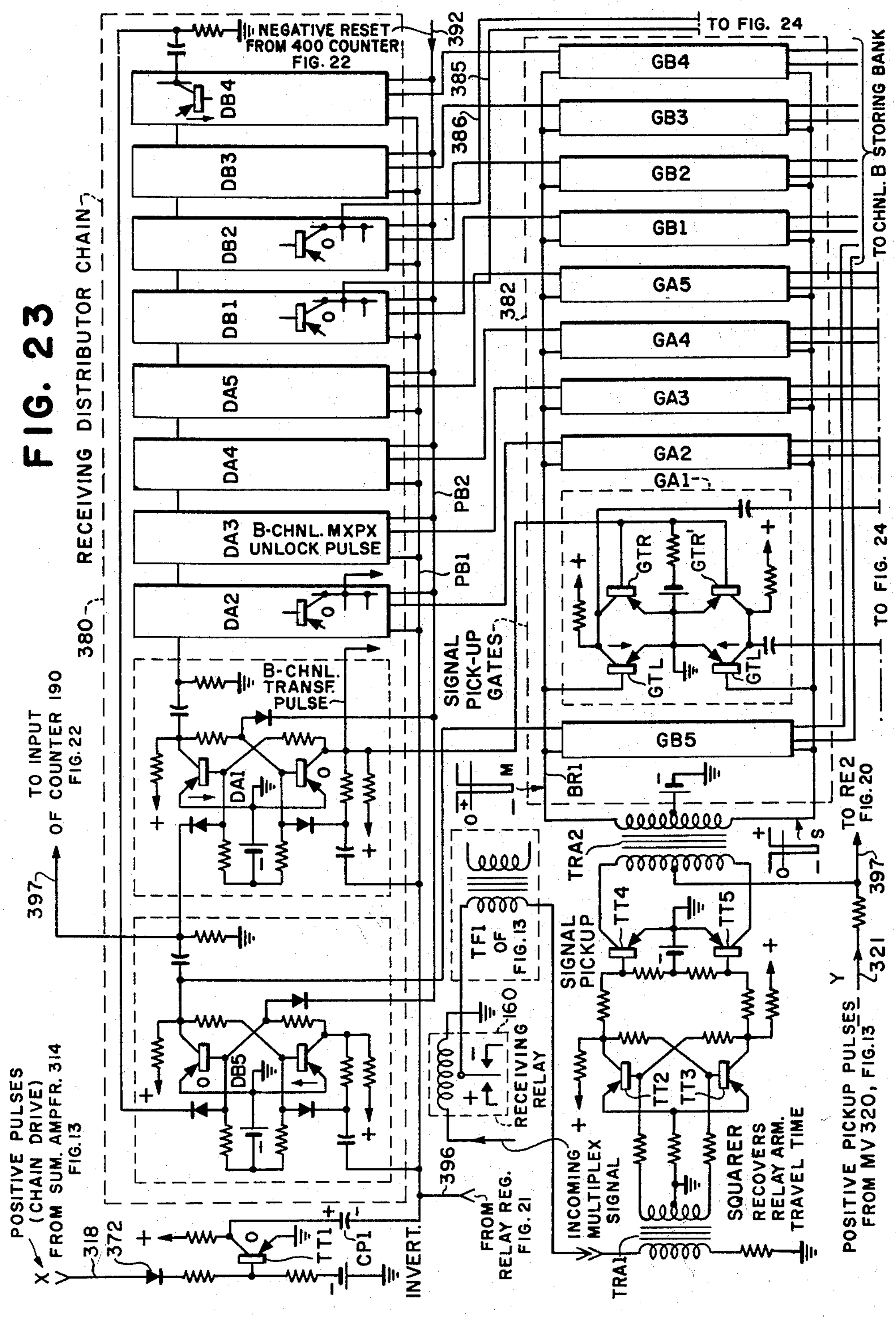
Figure 24:
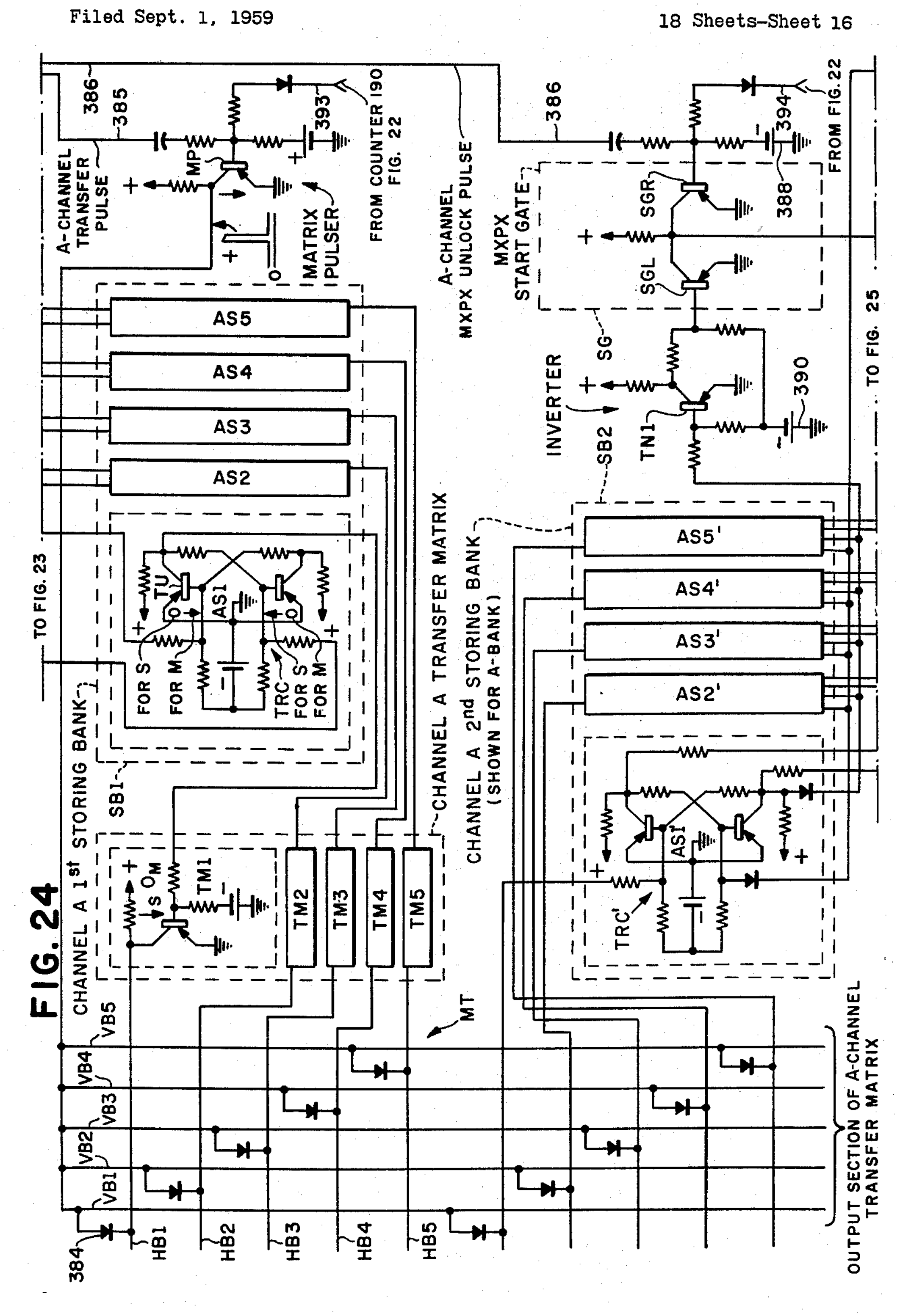
Figure 25:
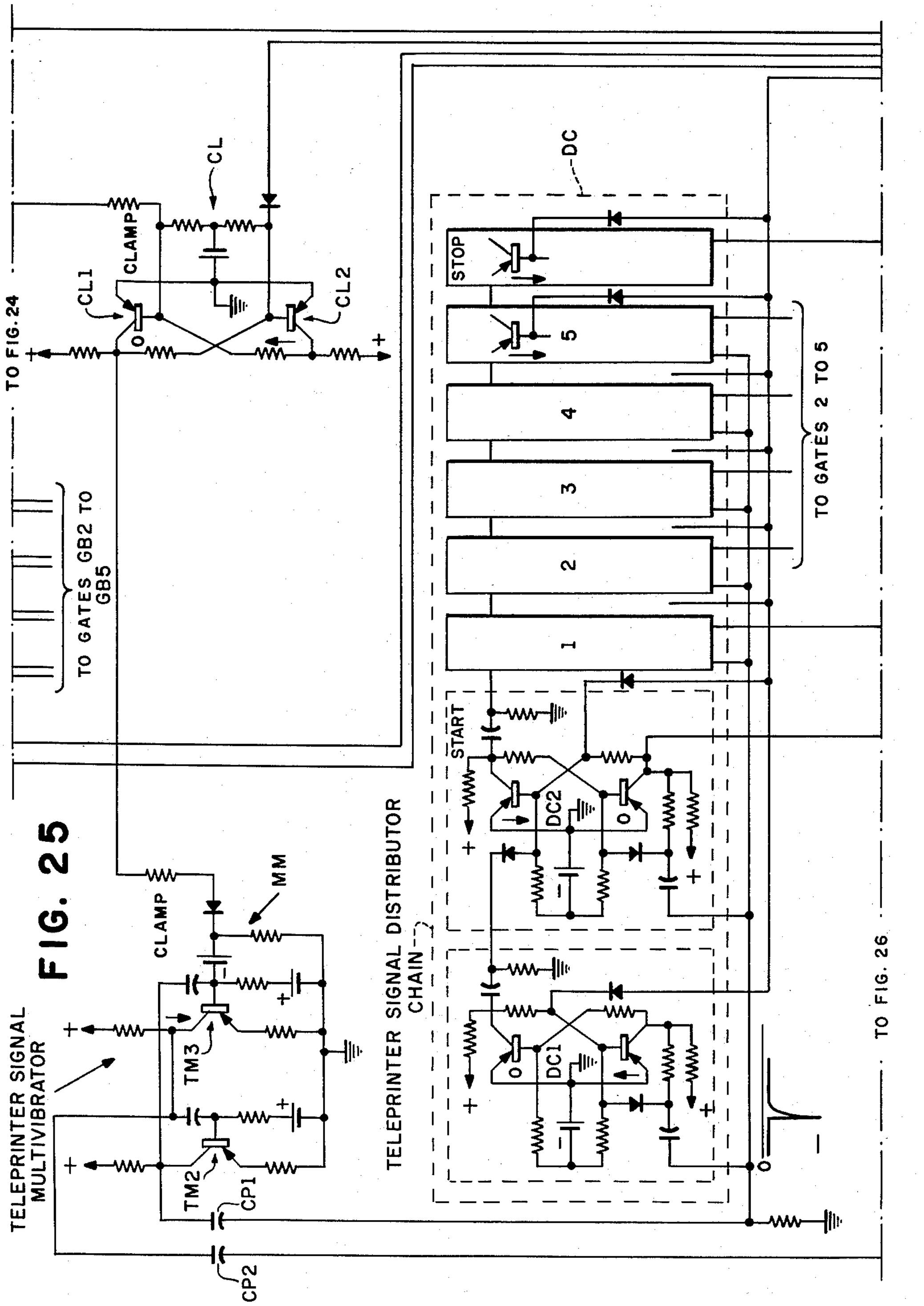
Figure 26:
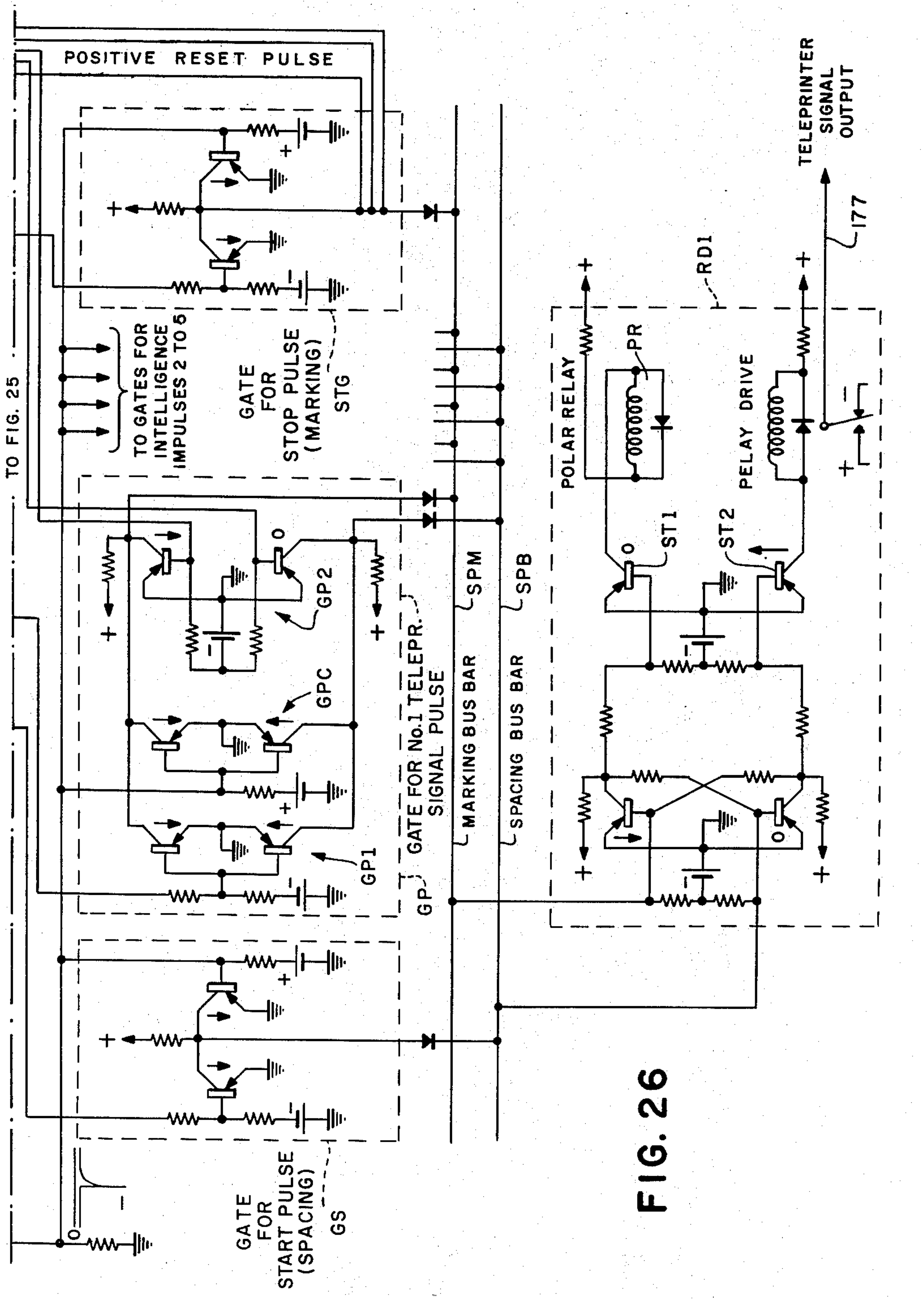

FIGS. 13 and 14 taken together constitute a ranging circuit employed in the system;

FIGS. 15–17, 15A–17A and 15B–17B are pulse diagrams employed in explaining the mode of operation of the ranging circuit;

FIG. 18 is a schematic diagram and FIG. 19 is a pulse diagram employing the electronic clutching action of the ranging circuit;

FIGS. 20 and 21 are diagrams of timer and counter circuits employed in the receiving terminal of the system;

FIG. 22 is a diagram of a four hundred operations counter employed at the receiving terminal;

FIGS. 23, 24 and 25 taken together constitute a diagram of a receiving multiplex distributor circuit; and FIG. 26 is a diagram of a multiplex signal to teleprinter signal conversion circuit.

The system to be described employs transmission of five-unit code message traffic common to landline telegraphy, but it can be readily adapted for handling six-unit code traffic such as used in ocean cable telegraphy.

Signals are transmitted on two channels, herein designated channel A and channel B. The system can be expanded, however, to accommodate three or more channels, depending on the speed of operation of the teleprinters at the receiving ends of the system. The message signals may be generated by two independent remote teleprinters, telegraph keys, etc. If the message traffic originates at two remote independent points, it will be delivered to two independent reperforators at the transmitting terminal of the system. The transmitting terminal employs a distributor transmitter having separate groups of sending segments assigned to transmit message signals from the respective reperforators. The message signals are stored in five-unit code form on the perforated tape and transmitted by the distributor transmitter at a predetermined maximum rate. In the system to be described this speed is set at 380 characters per minute. Each burst of transmission will consist of 402 operations and is more or less an arbitrary number. Because the speed of the distributor-transmitter is fixed at 380 operations per minute each burst will persist for just over three seconds longer than one minute. Of the 402 operations per burst the first operation will contain the starting and alignment signals for setting the receiving terminal in motion, while the 402nd operation is an idling one to allow the receiving operations to cease. The remaining four hundred operations are allotted to the transmission of intelligence and an occasional blank amounting, on the average, to about twelve in number. As the speed of the distant keyboard motors change because of variation in frequency of the public utility, the number of blanks per burst will vary slightly.

*The Sending Multiplex Terminal*

Figure 1:
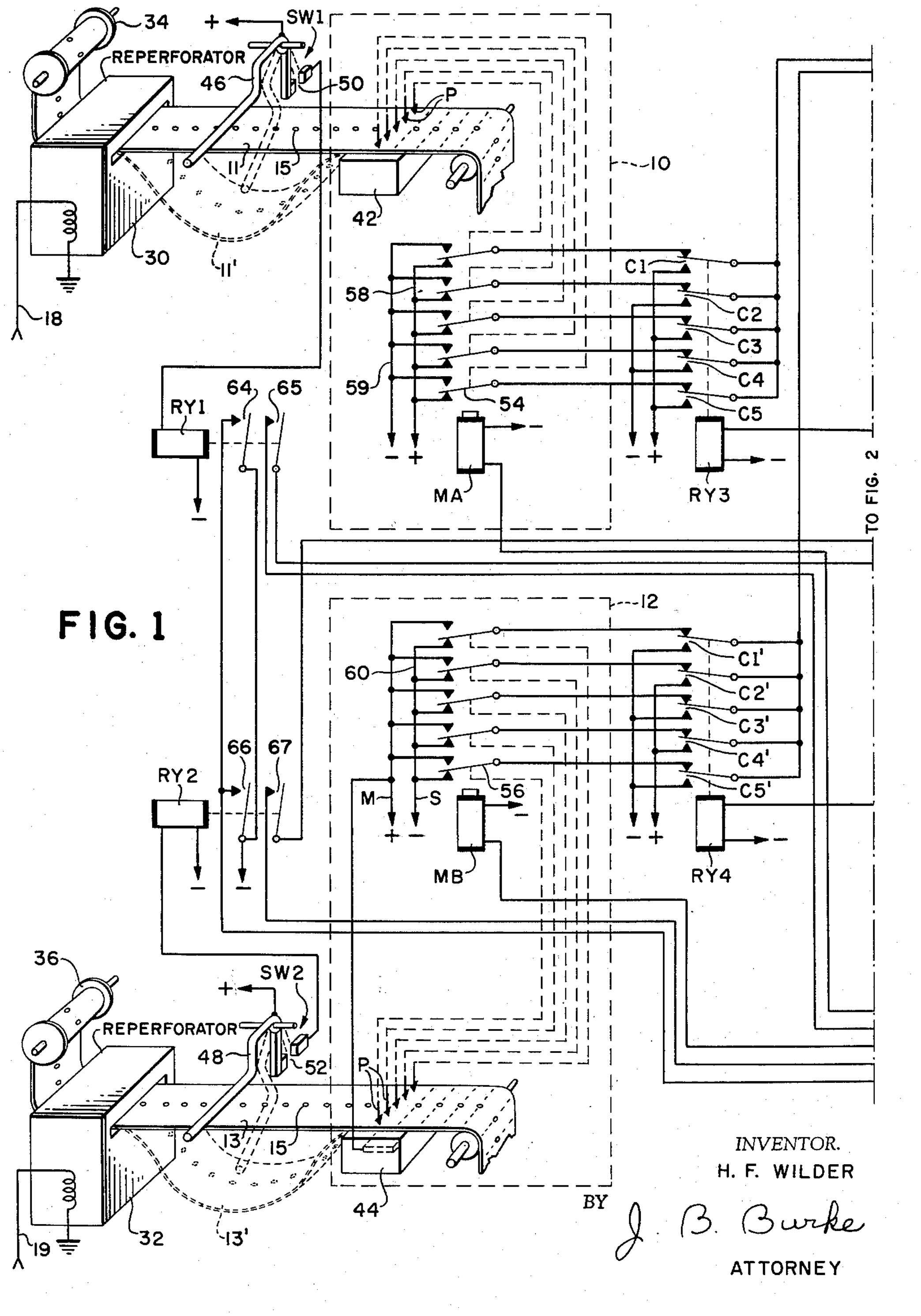
Figure 2:
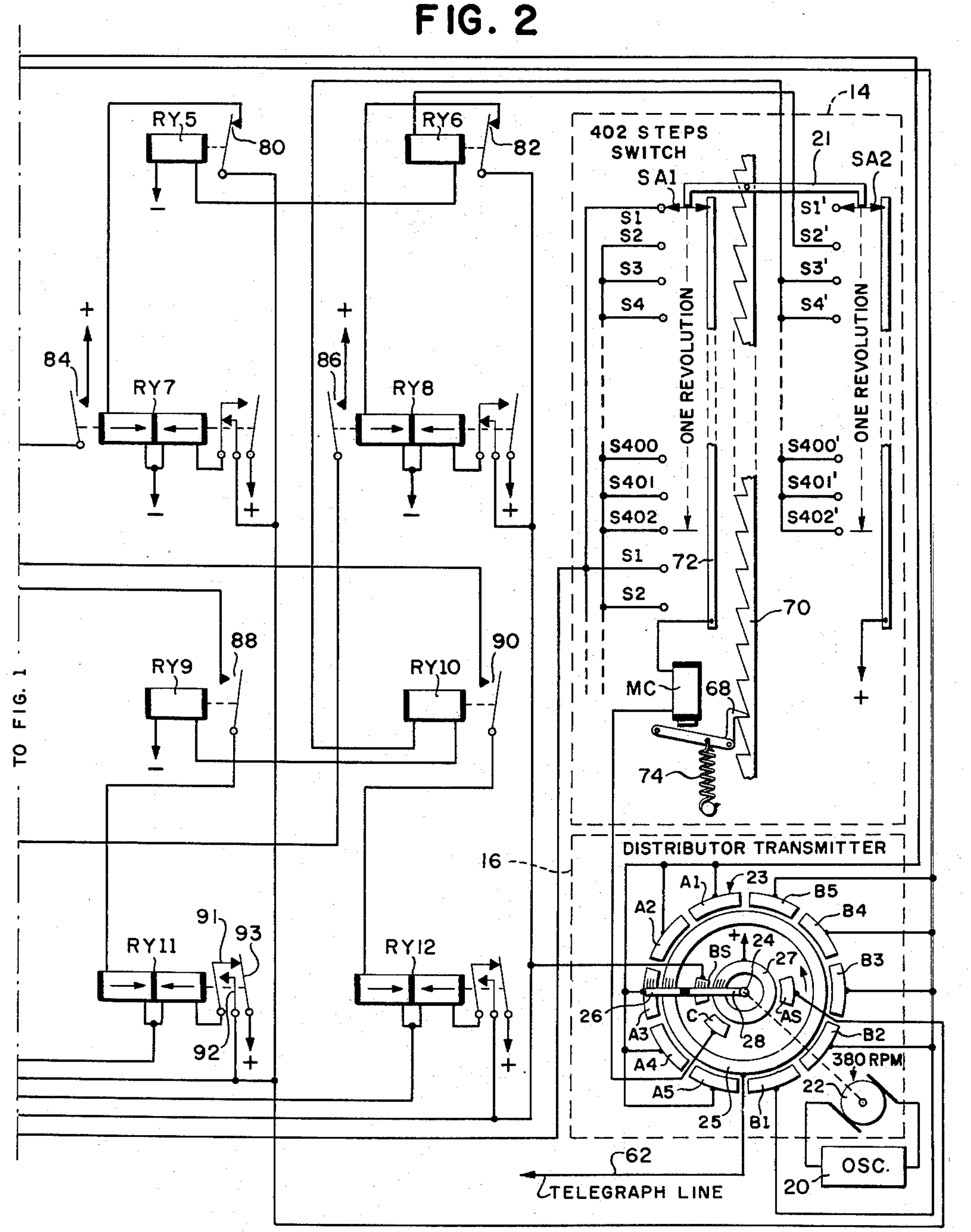

FIGS. 1 and 2 show a sending multiplex terminal which may be employed in the system for passing bursts of four hundred pulses preceded by spacing, starting and alignment pulses according to the invention. The terminal includes two multiplex telegraph transmitters 10 and 12, a two-level stepping switch 14 having four hundred two positions, a two-channel multiplex distributor transmitter 16, and control relays RY1–RY12.

The distributor transmitter includes a stable oscillator 20 which provides a standard frequency source for energizing motor 22. The motor drives rotor 24. The rotor carries sending brush 26 and local ring brush 28. Brush 26 passes over a ring 23 of ten segments A1–A5 and B1–B5 and an adjacent continuous ring 25. Brush 28 passes over segments AS and BS in one path and a continuous ring 27 in an adjacent path. The rotor 24 of the two-channel multiplex distributor transmitter is driven at 380 r.p.m. by motor 22 which is pulsed by oscillator 20. The oscillator is free running and should have a frequency stability of one cycle in 200,000 or better. The two-level four hundred two step rotary switch 14 serves as a pulse counter. The two multiplex transmitters 10 and 12 are assoicated with perforators 30, 32 which automatically perforate tapes 11, 13, respectively, in response to telegraph signals applied via lines 18, 19 from teleprinters, keys or other sources. The signals are applied to the reperforators at 368 characters per minute. The unperforated tape is carried on reels 34 and 36 and is drawn through the perforators by the sprocket wheels (not shown) which engage in the centrally located sprocket holes 15 in the tapes. Spaced from the perforators are sensing members 42, 44, each of which has five sensing pins P for use in detecting five element code characters on the tape. The tapes leaving the perforators are drawn taut by sprocket wheels in the sensing members engaging in holes 15 of the tapes. These sensing members may be of conventional type such as described in U.S. Patent to G. R. Benjamin 1,298,440.

Automatic transmitting stopping devices are associated with the transmitters 10 and 12. These include auto-stop arms 46 and 48 pivoted to contact the respective tapes when they are held taut. Arms 46, 48 operate switches SW1 and SW2. The switch contacts 50 and 52 are normally open when the tapes are taut and the arms 46, 48 are raised.

In describing operation of the sending terminal it will be assumed no message signal traffic is waiting. The auto-stop arms are resting or riding on the taut tapes and both transmitters are auto-stopped, that is, their magnets MA and MB are energized, the pins P at sensing members 42, 44 are retracted, and the five unit contacts 54 and 56 rest on positive and negative busbars 58 and 60 respectively.

In this idling condition, the segmented ring 23 passes current alternations or reversals to outgoing telegraph line 62 continuously, five successive positive pulses being applied from the A channel transmitter 10 and five negative pulses being applied from the B channel transmitter 12 during each revolution of rotor 24. Both sensing arms SA1 and SA2 which are operated together by switch bar 21 connected to ratchet bar 70 of stepper switch 14, rest on the first stud S1 and S1′ of the two switch levels. The circuit of the switch stepper magnet MC is open since stud S1 is now connected to open paralleled contacts 64, 66 of relays RY1 and RY2 respectively. These relays follow the contact operation of switches SW1 and SW2 as controlled by their respective auto-stop arms 46 and 48. Differential relays RY11 and RY12 are held operated through their right-hand coils and energize the transmitter magnets MA and MB with steady direct current. All relays RY1–RY10 are released.

When message traffic is waiting to be sent from either reperforator 30 or 32, its tape will slacken to form a loop 11′ or 13′ whereupon the arm 46 or 48 will drop and contacts of the associated switch will close. Suppose channel A wishes to send message signals. Auto-stop contacts 50 will close as arm 46 drops to energize relay RY1. As the local ring brush 28 in the distributor transmitter 16 passes over stepping segment C, the magnet MC will move the ratchet 68 to the next tooth on ratchet bar 70 in switch 14, the circuit of magnet MC being closed through contacts 64 of relay RY1, stud S1, wiper arm SA1, bar 72, segment C and ring 27. The magnet circuit is broken as the brush 28 passes segment C and spring 74 advances the ratchet and ratchet bar one step. As the ratchet bar advances, wiper arms SA1 and SA2 will advance to studs S2 and S2′ on their respective switch levels. With arm SA2 on stud S2′ relays RY5 and RY6 will operate opening their normally closed contacts 80, 82 to open the left-hand coil circuits of the differential relays RY7 and RY8. When brush 28 then passes over segment AS, relay RY7 will be pulsed and will lock up to operate A.-C. relay RY3 via contacts 84 of relay RY7. When the brush next passes over segment BS, relay RY8 will similarly be pulsed to lock up and operate A.-C. relay RY4 via contacts 86 of relay RY8.

Relays RY3 and RY4 operate to cause alternating pulses to be applied to the sending segments 23 of each channel. This is accomplished because of the positive polarity applied to contacts C1, C3, C5, C2′, C4′ of the relays while negative battery polarity is applied to contacts C2, C4, C1′, C3′ and C5′. This produces the A.-C. alignment signal used to start the receiving terminal and upon which that terminal "centers" the scanning of the signals.

During the first revolution of rotor 24, the relays RY11 and RY12 are energized as current passes only through the right-hand coils of the relays. The left-hand coils are not energized because of the open contacts 88 and 90 in relays RY9 and RY10. When brush 28 passes over segment C for the second time, the ratchet operates the wipers SA1 and SA2 through studs S2 and S2′ to studs S3 and S3′. This immediately operates relays RY9 and RY10 and releases RY5 and RY6. Thus when the brush 28 reaches segment AS, relay RY7 is released because the currents in its coils are now equal and opposite. This deenergizes and drops relay RY3 restoring the segments A1–A5 to the transmitter contacts 54 via contacts C1–C5. At the same time equal and opposite currents appear in relay RY11 because of the closure of contacts 88 in relay RY9, 65 in relay RY1 and 91, 92 in relay RY11. Relay RY11 releases to open contacts 91, 93 and close contacts 91, 92 and when the brush passes off segment AS the sensing pins P in sensing member 42 operate the transmitter contacts 54 to close the marking circuit through bus 59 in accordance with the code of the character then in place on the tape 11.

When brush 28 passes over segment BS, relay RY8 is released in a manner similar to relay RY7 to restore the channel B segments B1–B5 to the channel B transmitter 12 through contacts C1′–C5′. However, because the tape 13 is taut between the reperforator 32 and the sensing member 44, relay RY2 is released and maintains an open circuit for the left-hand coil of RY12. The latter remains operated and the magnet MB remains energized.

On subsequent revolutions of the distributor transmitters 10 or 12 can cut in or cut out at will depending on whether the loops of tapes 11 and 13 are slack or taut. Wiper arms SA1 and SA2 will complete four hundred two steps in passing studs S1–S402 and S1′–S402′ respectively. When the wiper arms are again stepped to studs S1 and S1′, relays RY9 and RY10 are released and on the next distributor revolution relays RY11 and RY12 are both operated to energize magnets MA and MB thus auto-stopping both the transmitters regardless of whether message traffic is waiting to be sent, so that a full revolution of channel spacing is sent. If both tape loops are taut, relays RY1 and RY2 will be released and the stepper switch 14 will not operate. Both relays RY11 and RY12 will remain in the energized auto-stopped condition. However, if there is traffic waiting to be sent by either transmitter after switch 14 has stepped to studs S1 and S1′ the magnet MC circuit will be closed by operation of relay RY1 or RY2 and the ratchet 68 will be actuated on contact of brush 28 with segment C as previously described to repeat the starting and alignment signal as before.

It will thus be apparent that the sending terminal operates in bursts of four hundred and two steps. Current reversals are sent continuously in the absence of any message traffic waiting to be sent. If any traffic is waiting, then the starting and alignment signal is sent to synchronize the receiving and sending terminals. Upon completion of the starting and alignment signal a sequence of 400 steps accomplishes transmission of a burst of five-unit coded characters provided by either or both transmitters. When 400 steps are completed the sending of traffic is halted to permit sending one spacing pulse and another alignment signal and then continuing the sending of traffic for another burst of 400 steps.

The selection of four hundred and two steps for the complete sending cycle is entirely arbitrary. There could be a larger or smaller number of steps in each revolution. The number of steps set up for each revolution will primarily depend on the length of time the sending and receiving terminals can safely be run without synchronization and the counting cycle of the stepping or operations counter at the receiving terminal. For standard frequency sources at the sending and receiving terminals having a stability of one cycle in 200,000 per second, one minute is considered a safe time limit for running the two terminals without synchronization, and a revolution of about 400 steps is considered optimum. If the standard frequency sources have better stability than one cycle in 200,000 cycles per second, such as one cycle in 500,000 cycles per second, the system could be operated for two minutes with a longer burst of about eight hundred steps, for example.

*The Starting and Aligning Signals*

The present system transmits channel reversals or spacing signals when the system is idling in the absence of message traffic to be transmitted on either of the two transmitting channels. One advantage which accrues from the receipt at the receiving station at all times of signal reversals when either carrying traffic or when idle is that a loss of circut continuity between transmitting and receiving stations can be made to actuate an alarm. A further advantage is that the continuous reversals tend to eliminate signal bias, because the electrical and magnetic characteristics of the circuit components are less likely to drift from their centered positions. For example, drift is avoided in amplifier vacuum tubes since they are not required to carry full plate current continuously which otherwise would adversely affect cathode emission. Also, residual magnetism or remanence induced in core material of relays by hysteresis effects is reduced.

Should either one of the two tributary circuits feeding the sending multiplex transmit just one or a series of characters from its keyboard or transmitter-distributor, the sending multiplex terminal will send to the receiving terminal the starting and aligning signal. This signal will consist of five reversals at the frequency of the two channel multiplex. The first impulse of this group of signal reversals will be of spacing battery and this mark-to-space transition will, just as will any mark-to-place transition during the idle period, initiate both a counter and a short-time interval timer at the receiving terminal. If the counter "sees" subsequently to the first mark-to-space transition, a marking impulse followed by a spacing impulse and then another marking impulse before the timer shuts off, the receiver will recognize the signal as a genuine start. This coding of the start signal is intended to preclude starting the receiver because of a spurious signal or momentary open on the carrier frequency. It will also prevent starting on the mark-to-space signal transitions of the channel reversals for in this case the short time timer will disable the counter before it can count the necessary signal transitions of the code. The remaining reversals in the starting signal are used at the receiving multiplex terminal to determine automatically the range center in a manner to be described.

Figures 3, 12:
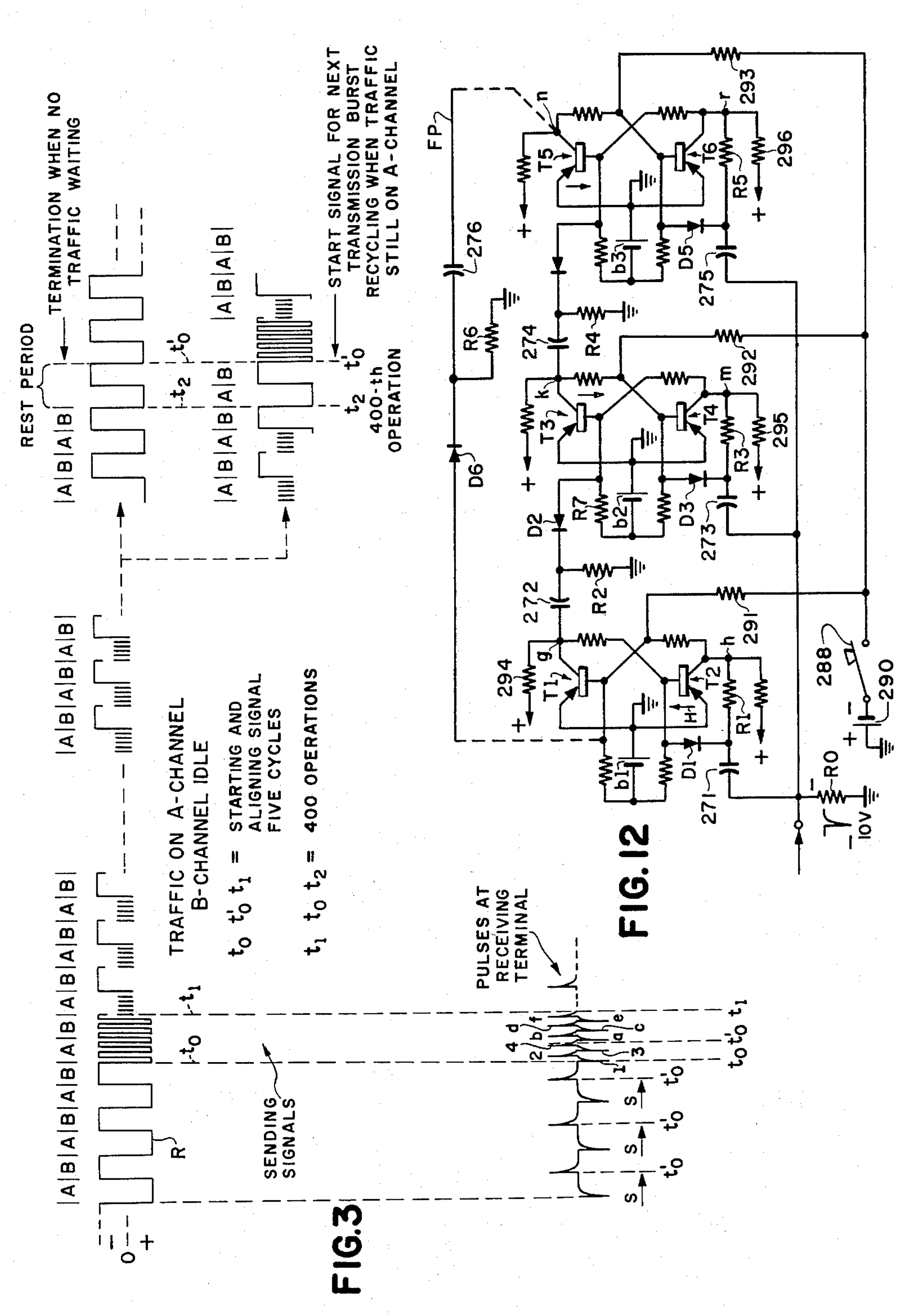
FIG. 3 is a diagram showing graphically pulses employed in the system.
FIG. 12 is a diagram of a typical chain of trigger circuits as employed in the system.

FIG. 3 depicts the form of signals transmited by a sending terminal. At first the circuit is idle and transmitting channel signal reversals R, reversing from minus (−) to plus (+) battery potential as shown. Just prior to time $t_0$ a signal source in channel A is assumed to have begun sending and so for the time $t_0$ to $t_1$ the system sends the five reversals of the starting code. At its conclusion $t_1$, signals representing characters stored on the tape 11 are sent out by the sending terminal until 400 characters have been transmitted. If the message in channel A contains less than 400 characters, the channel will then send blanks and the distant receiving line will be closed. If the message contains more than 400 characters, the cycle of starting and realignment will be repeated after each 400 characters are sent. Channel B can begin sending at any time during the 400 character burst and channel B could just as well have initiated transmission instead of channel A.

The 400 operations of the sending terminal between times $t_1$ and$t_2$ are counted by an electronic counter at the receiving terminal. The send terminal upon reaching the 400th count sends a blank or spacing on both channels A and B and in this interval restores the sending system to the original condition prior to time $t_0$. If then neither channel A nor B has information to send, the system will continue to send channel reversals. If either teleprinter channel is still sending, the start signal code will again be transmitted and another 400 operations of the system will be initiated.

In FIG. 3 the spiked pulses I derived from the incoming signal at the receiving terminal are shown for the start and alignment signals. Pulses S initiate the action of the receiving terminal. The range center is determined by the six signal crossovers *a* to *f*. These pulses are without characteristic distortion but may be affected by fortuitous distortion or bias. The receiving terminal operates to eliminate these effects as is explained later to obtain true and "centered" signal pick-up instants.

The receiving terminal scans the pulses S until instants $t'_0$ and look for the start code pulses 1, 2 and 3. If these pulses 1, 2 and 3 are not counted, the receiving terminal resets at time $t'_0$. If the start pulses 1, 2 and 3 are present and counted within time $t_0$–$t'_0$, then circuit reset is denied and the ranging circuitry integrates the phase of alignment pulses *a* to *f*, as will be described.

*The Receiving Terminal*

FIG. 4 shows in block diagram form the basic components of the receiving terminal of the system. A stable oscillator 150 provides a controlling signal of predetermined frequency for the receiving terminal. For operating the system at 380 operations per minute to channelize two sixty words per minute teleprinter circuits, a frequency source generating 63⅓ cycles per second is required. This is twice the fastest pulse reversal frequency of the sending terminal. One cycle is completed for each telegraph impulse or "bit" of the sending terminal. As will be shown later, the negative going wavefront of each cycle will be used to scan the telegraph impulses at the pickup or selection instant. In order that during a transmission burst of 400 operations the signal pickup shall not drift more than about plus or minus 4% from the pre-selected optimum center of the bit, the frequency source 150 should have a stability of one in 200,000 parts. Such stability can be readily obtained with a ferrite cored inductance capacitively tuned vacuum tube oscillator stabilized with respect to supply voltage and temperature. An amplifier 152 is connected between the oscillator and the lines 193 to apply the oscillator signal frequency to generator 192 in amplified state.

Incoming telegraph traffic signals and channel reversals arrive at the receiving terminal via line 62 and are applied via contacts 156–158 of receiving relay 160 to a start signal counter 162 and timer 164.

Counter 162 and timer 164 simultaneously scan the incoming signals continuously. They serve to recognize a genuine start signal and respond to active the ranging circuit 168 and distributor chain 170. Relay 172 is connected between the counter and timer and the ranging circuit.

After an automatic range has been taken by the circuit 168 to center signal pickup for the duration of the following burst of transmission, the signals are passed through the multiplex receiving distributing chain 170 and the signals of the two channels are decombined and fed to their respective multiplex-to-teleprinter translators 174, 176. These translators send the reconstituted teleprinter signals via relay drives RD1 and RD2 and lines 177, 178 to the respective distant receiving teleprinters 171, 173. All blank characters transmitted are deleted by the translators 174, 176. During the reception of a blank and the multiplex spacing or idling channel reversals the teleprinter lines 177, 178 are held closed with marking battery polarity. A 400 operations counter 190 is connected between the ranging circuit 168 and multiplex distributor 170 to count the 400 successive operations which constitute one transmission burst.

A phase shifting type of multiple phase generator 192 is provided at the receiving terminal. This generator is connected via lines 193 to lines 194 and is excited by the frequency source 150 at a frequency exactly twice that of the line reversal frequency of the multiplex or time division part of the circuit. The purpose of generator 192 is to supply ten alternating electromotive forces of the same frequency as that of the frequency source 150 but separated in phase one from the other by an angle of 36°. The generator 192 has twenty output lines 194 connected to the ranging circuit.

Figure 5:
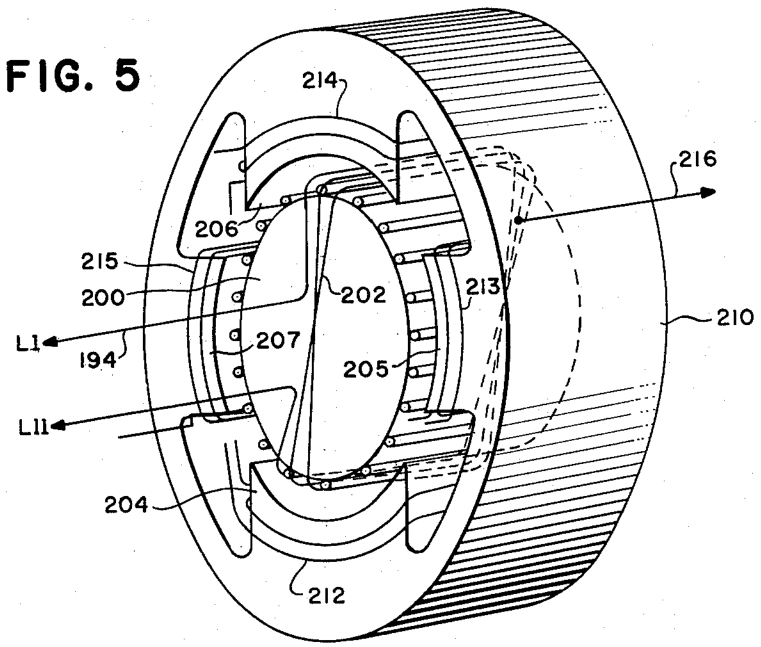
FIG. 5 is a perspective view of the multiple phase generator as employed in the system.
Figure 6:
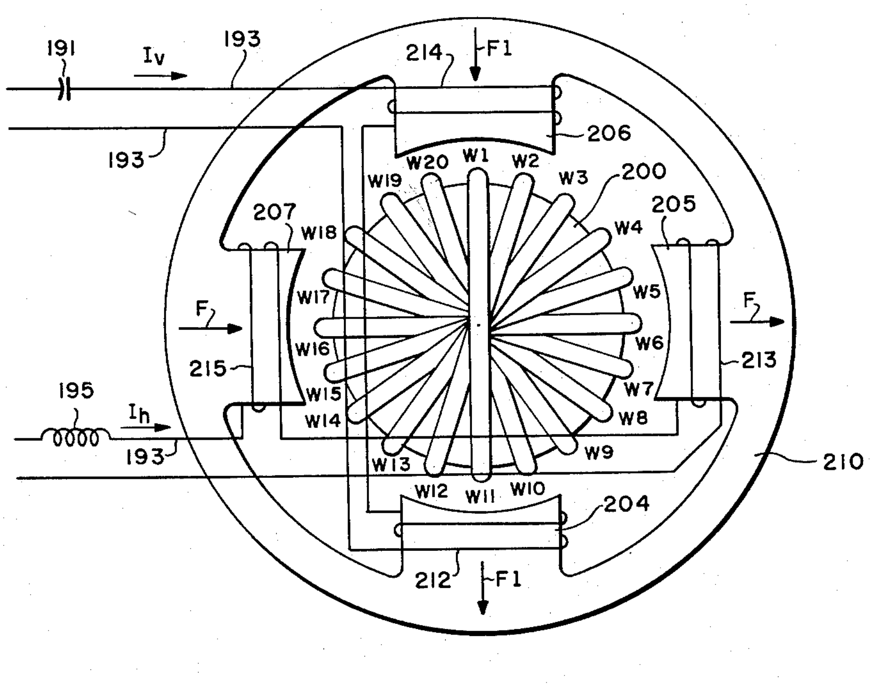
FIG. 6 is a front elevational view partially schematic in form of the multiple phase generator.
Figure 7:
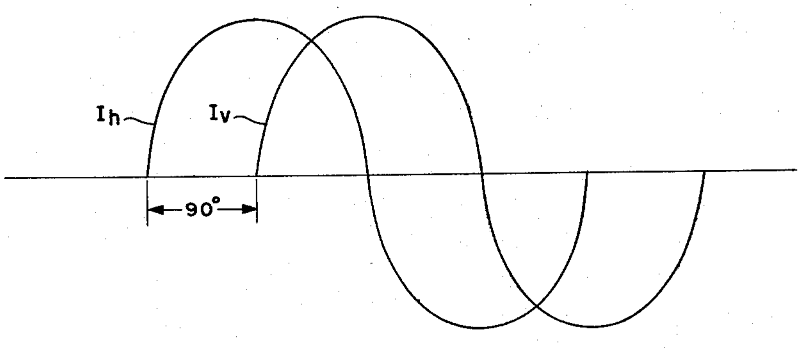
FIG. 7 is a graphic diagram of the quadrature exciting currents in the multiple phase generator.

The multiple phase generator is shown in greater detail in FIGS. 5 and 6. It consists of a stationary armature 200 wound with ten equiangular spaced coils 202 each centertapped by a wire 216 to provide twenty coil sections W1–W20. The turns 202 are centered within the poles 204–207 of a four-pole magnetic field 210. Pairs of field windings 212, 214 and 213, 215 are connected orthogonally and excited by alternating voltages to produce currents $I_v$ and $I_h$ in quadrature at the frequency of the oscillator 150. The current $I_v$ applied to the windings 212, 214 on poles 204, 206 differs from the current $I_h$ applied to the windings 213, 215 on poles 205, 207 by 90°. The magnetic fields generated in windings 212, 214 and 213, 215 are oriented 90° apart as indicated by arrows F, F′. In FIG. 7 are shown curves representing currents $I_h$ and $I_v$ in the field windings. It will be noted that current $I_h$ differs in phase from $I_v$ by 90°.

Figure 8:
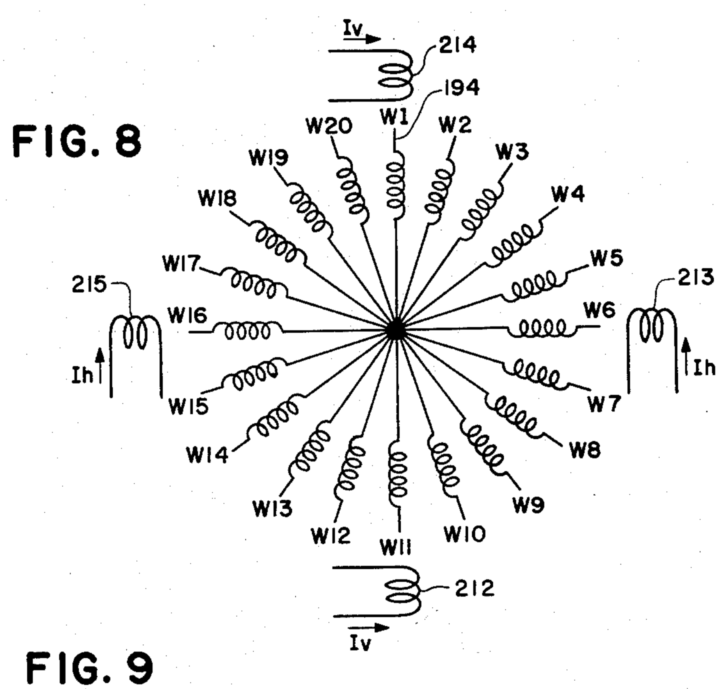
FIG. 8 is a schematic diagram of windings of the multiple phase generator.
Figure 9:
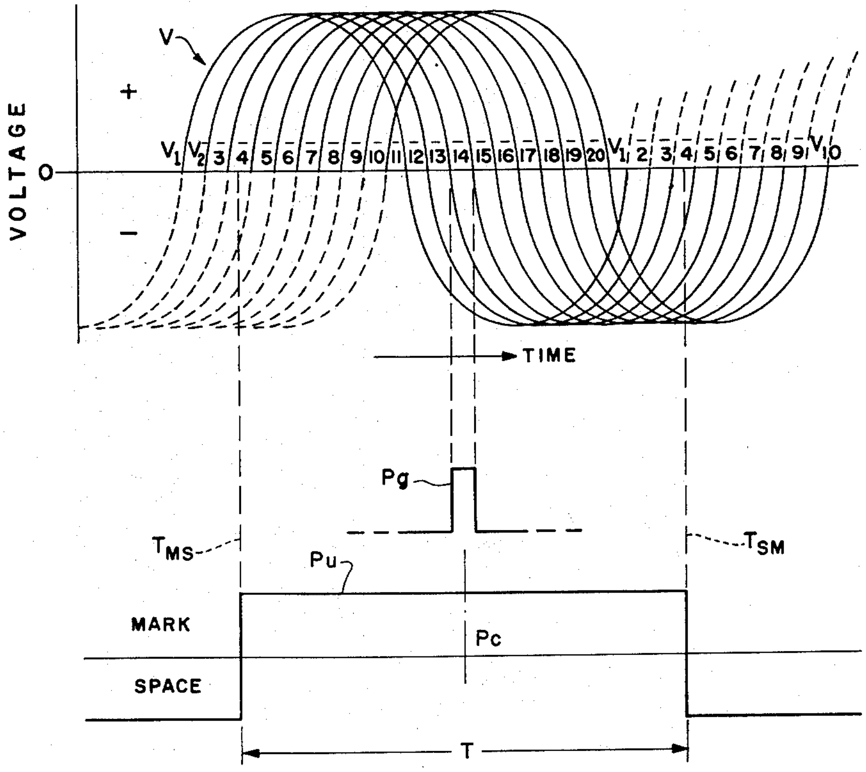
FIG. 9 is a graphic diagram of voltages produced by the multiple phase generator.

FIG. 8 illustrates schematically the arrangement of the armature winding 202 in which there are twenty winding sections W1–W20 equally spaced angularly 180° apart. The field windings 212, 214 and 213, 215 are arranged in orthogonal pairs and are excited to produce currents $I_v$ and $I_h$ in quadrature. In order to displace the phase of currents $I_v$ and $I_h$ by 90°, a capacitor 191 is placed in series with coils 212, 214 and an inductance 195 in series with coils 213, 215, and the values of these external reactances are adjusted until the required quadrature condition is obtained. The alternating currents exciting the field winding result in a rotating electromagnetic field which cuts across each two sections of the armature winding 202 in succession twice per revolution of the field and generates a sinusoidal alternating potential in each winding at the exciting frequency. FIG. 9 shows curves of the ten alternating potentials V representing ten voltage outputs of the generator 192 obtained at output lines 194 across the ten turns of the winding 202. The curves are plotted for an interval against time and a single undistorted telegraph impulse P*u* is shown below the curves V plotted to the same time scale. The time interval T is assumed to be 15.8 milliseconds.

The theory of signal regeneration employed in the present system holds that the intended signal polarity of a pulse is least likely to be impaired when a determination, sampling, or "pickup" is made at the center of its time duration. Thus pickup is effected in the time interval between passing downwards through zero of the alternating voltages V3, V13, and V4, V14 generated by winding sections W3, W13 and W4, W14, so that the condition for optimum signal regeneration is met satisfactorily. From the geometry of FIG. 9 it will be seen that the space-to-mark and the mark-to-space alignment signal transitions occur ninety electrical degrees (90°) away from the desired pickup interval, namely, at times $T_{MS}$ and $T_{SM}$ between the crossing of the zero axis by voltages V3 and V4. These signal transitions are used to set up an alternating potential dependent upon their coincidence with the ten generator outputs. The reversal of this alternating potential 180° later generates a pickup gate pulse P*g* at the center P*c* of the alignment signal pulse.

Figure 11:
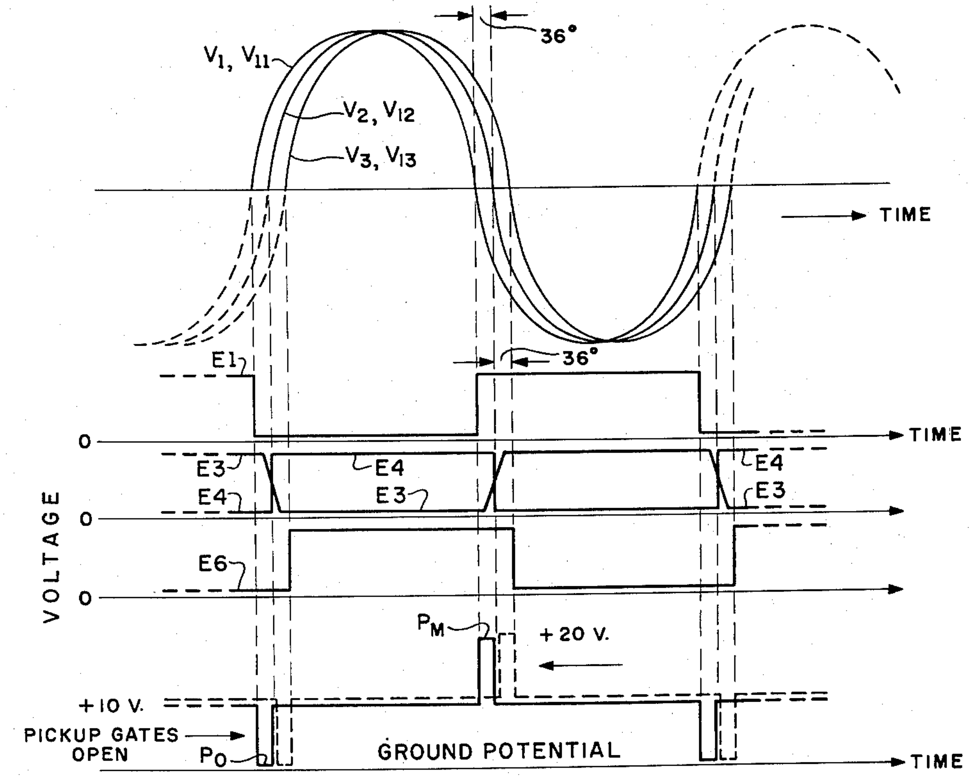
FIG. 11 is a pulse diagram employed in explaining operation of the gate circuits.
Figures 10, 10A:
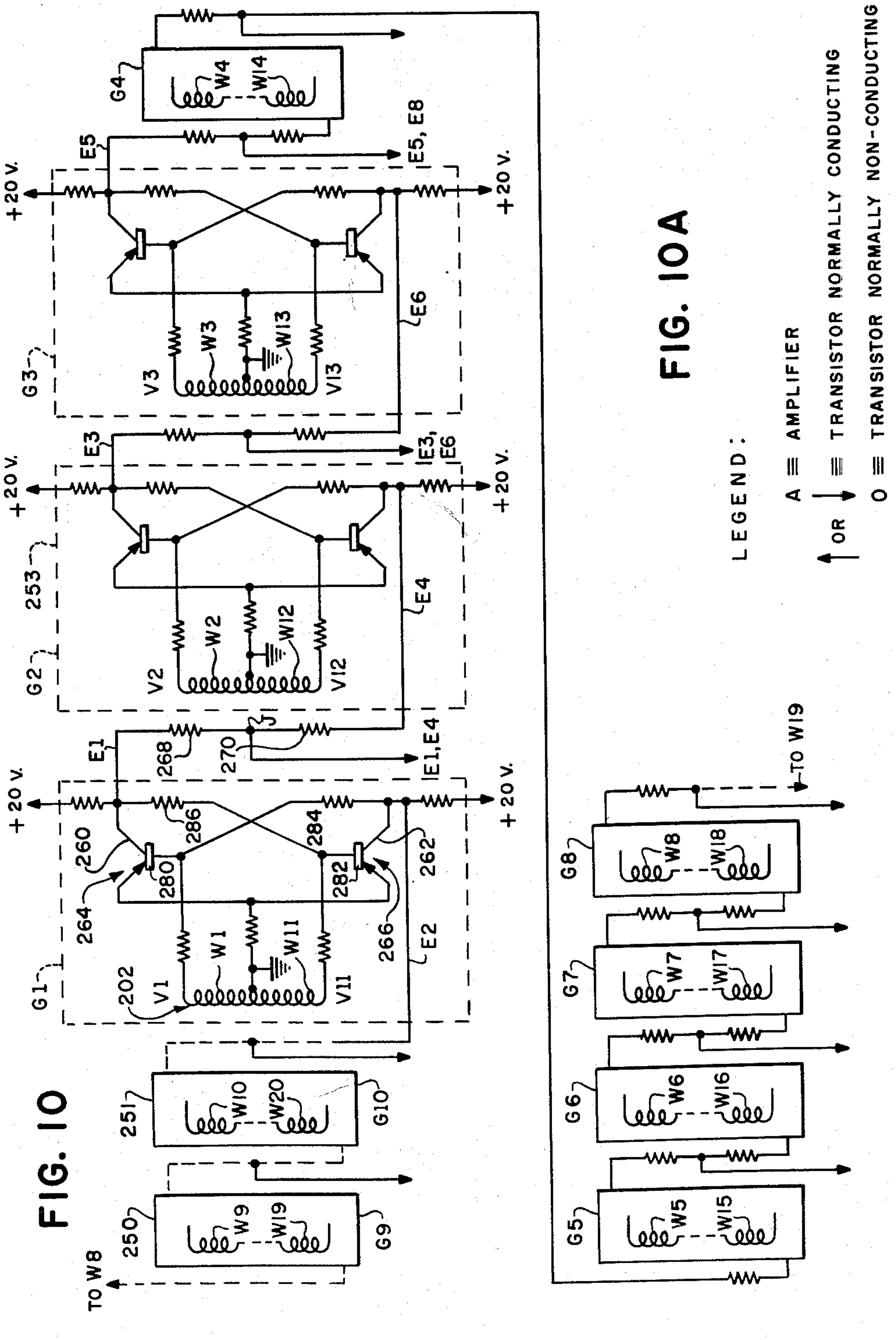
FIG. 10 is a schematic diagram of gate circuits associated with the multiple phase generator.
FIG. 10A is a legend showing conductive states of transistors employed in the system.

With elapsed time the local frequency source 150 may slowly drift in phase with respect to the signals received from the sending terminal; that is why it is necessary to reestablish the pickup gate pulse about every minute, well before the drift can become of other than negligible magnitude. In order to develop the twenty pickup gate pulses, the ten center tapped windings 202 are made to drive ten bistable transistor flip-flop trigger circuits G1–G10 as shown in FIG. 10. Only three of these circuits G1–G3 are shown in detail along with the three pairs of winding sections W1, W11; W2, W12; W3, W13 which generate the alternating potentials V1, V11; V2, V12; and V3, V13 differing in phase by 36° as shown in FIG. 9. The flip-flop trigger circuits G1–G9 convert the sinusoidal waveforms of generator 192 to the rectangular form as shown in FIG. 11. Due to the 36° phase difference there are short intervals wherein the rectangular output voltages E1–E6 of the flip-flop circuits are not in opposition but can be either both high or both low with respect to the ground or zero reference level. Opposing collectors 260, 262 of the translators 264, 266 in each of the flip-flop circuits are connected through a resistance composed of two equal resistors 268, 270 as shown in FIG. 10. The voltage generated at their junction J will be of the form shown in FIG. 1. Any two successive alternating potentials from the multiple phase generator 192 thus produce, during one cycle of the standard frequency source 150, one short interval of substantially zero pickup gate voltage $P_0$ and another short interval of maximum pickup gate voltage $P_m$. At other times the voltage output of the flip-flop trigger circuits G1–G10 is of median amplitude.

*Basic Circuits*

The pickup gate circuits G1–G10, timer 164, counter 162, ranging circuits 168 and other components of the receiving terminal employ transistors as active elements therein. The transistors are of the NPN type. This type of transistor conducts when a current pulse applied at the input produces a base voltage which is positive with respect to the emitter and negative with respect to the collector. This type of transistor cuts off current flow between emitter and collector when the input pulse or voltage drives the base potential more negative than the emitter or more positive than the collector.

In all circuits shown in the drawings, the arrowhead symbol when used indicates that the transistor is in a normal conducting state as shown in FIG. 10A. The absence of such an arrowhead at a zero indicates that the transistor is normally cut-off or nonconducting.

The transistor circuits in the system respond to on and off or mark and space signal current conditions and to various square and peaked trigger current pulses. The base is used as the control electrode in all circuits and all input pulses are applied to it. The transistors are biased for operation close to the knee of their response curves so that a base current which produces base voltage greater than the emitter voltage results in no significant collector current and the base may then be considered an open circuit between the emitter and collector. When so biased, the transistor circuits make use of the principle of "symmetrical operation" in which current may pass from one output electrode to the other through the transistor in either direction. If no electrode is grounded, the positively biased electrode is the collector. The transistor responds to minimal input or a variable input, as long as it exceeds a threshold voltage, with full conduction, producing the same output voltage for all suitable levels of input. Whether or not the transistor conducts under these conditions depends upon the absolute value of the bias voltages at the collector and emitter and upon the voltage of the base caused by current flow in the base circuit. If the base potential of the NPN type transistor is less than the emitter potential, the transistor is cut off. When this base voltage is greater than the emitter potential, the transistor conducts. The input signals to the base circuits are at a level to trigger the transistor into full conduction without overdriving it. If the base potential is derived from a part of the circuit which would tend to overdrive it, the base potential is clamped at a suitable value by a diode clamp to prevent accumulation of charge on the base of the transistor from the overdrivng currents. When the transistor conducts current flows between the emitter and collector until the collector output voltage approaches the emitter potential. This output voltage is available at the collector for transfer to another circuit. When the transistor is cut off, the collector bias voltage is available at the output. Thus the NPN transistor as used in present system conducts when a current pulse at the input produces a base voltage positive with respect to the emitter yet negative with respect to the collector as mentioned above; and the transistor cuts off when the input drives the base potential more negative than the emitter or more positive than the collector.

Each flip-flop circuit employed in the system of which the circuits G1–G10 of FIG. 10 are typical consists of two identical transistor stages arranged so that the bases 280, 282 of the respective transistors are connected through respective resistors 284, 286 to the collectors 262, 260 of the other transistors. When so connected a change of state of one transistor is immediately followed by a change of state in the other transistor so that the two transistors are always in opposite operating condition. This type of circuit has two stable conditions, each established by the base potentials of the interacting transistor. Either transistor may be conducting with its companion transistor cut off, when circuit operation starts and will remain in this condition unless the conditions which brought about the stable state are disturbed by an externally applied pulse or pulse chain, generally applied to a base circuit to bring about a change in the conducting states at some desired interval. Appropriately biased diodes in the inputs to the transistors may be used as means of arranging the flip-flop circuit to respond to pulses of a desired polarity. The outputs of such a flip-flop circuit are two square waves, like the curves of voltages E3, E4 in FIG. 11. These waves are 180° out of phase with each other at a frequency determined by the repetition rate of the applied pulse trigger.

The system also employs several multiple stage transistor counter chains. Each link in each chain consists of a flip-flop circuit containing two transistors in a bistable arranegment as described above. FIG. 12 is a diagram of a typical transistor counter chain as employed herein. It includes as shown three pairs of transistors T1, T2; T3, T4; and T5, T6. Transistors T2, T3 and T5 are assumed to be conducting as indicated by the presence of the arrowheads adjacent thereto. The other transistors are assumed to be non-conductive. This condition can be set up by pressing the key 288 in series with battery 290 although in actual practice in the system this is done by a negative battery voltage applied to the bases of all transistors by an automatically operated switch means. The negative battery voltage is applied through the resistors 291–293 to the bases of transistors T1, T4 and T6 which renders them non-conducting while the other transistors are conducting. The transistors are all of the NPN type; thus the collector voltages at points G, M and R become highly positive because of the application of positive voltages thereto through resistors 294–296. Each flip-flop stage of two transistors is connected in bistable flip-flop arrangement so that transistors T2, T3 and T5 are now conducting. Point *h* which is at the collector of transistor T2 is at ground voltage. There is no voltage across diode D1. Points *m* and *r* at the collectors of transistors T4 and T6 are at high positive potential. Diodes D3 and D5 at the bases of transistors T4 and T6 have high positive potential across their elements. Capacitor 272 located between the collector of transistor T1 and diode D2, which is connected to the base of transistor T3, will be charged positively through resistor R2 connected between the capacitor 272, diode D2 and ground. Capacitors 274 and 276 connected in the outputs of transistors T3 and T5 have no charge. Batteries *b*1, *b*2, *b*3 apply negative voltage to the bases of transistors T1 through T6.

When the first negative pulse appears across resistor R0 at the input to the counter chain, this pulse will be prevented from triggering the second and third stages consisting of transistors T3, T4 and T5, T6 because of the positive potential across the diodes D3 and D5. Since diode D1 connected to the base of transistor T2 is not biased positively, the applied negative pulse enters the base element of this transistor via capacitor 271, and causes this transistor to cut off whereupon transistor T1 will instantly become conductive because of the action of the feedback to its control base element from point *h* at the collector of transistor T2. The charge on capacitor 272 now flows to ground through transistor T1 and returns from ground through battery *b*2, resistor R7 and diode D2. In other words, a negative impulse will be applied to transistor T3 cutting it off and causing transistor T4 to become conductive. This removes the positive bias on diode D3 at the base of transistor T4 making this stage subject to total cut-off if a second negative impulse is applied thereto. Because transistor T2 is now cut off, diode D1 is biased positively through resistor R1 and negative impulses cannot cross this barrier.

When a second negative pulse appears across resistor R0, a negative current flows into the base of transistor T4 via capacitor 273 and diode D3 cutting off transistor T4 and returning transistor T3 to the conductive stage instantly. Capacitor 274 then discharges driving the base of transistor T5 negative and cutting off the transistor. This causes transistor T6 to conduct. Since transistor T4 has assumed a high positive bias potential again, diode D3 is again biased positive through resistor R3 and will not accept negative pulses. Diode D5, however, is not biased and can accept negative pulses via capacitor 275.

Suppose that it has been wanted to count just two negative pulses and then actuate an external circuit. A potential may be taken now from the collector of transistor T5 at point *n* and used to drive a relay, light a lamp, excite another circuit, etc. As a further alternative additional counting stages may be added to count four, five, or more pulses as required.

Suppose that it is desired to have the counter circuit capable of cycling continuously such as is required for the receiving multiplex distributor to be described; then the point *n* of transistor T5 would be coupled through capacitor 276, and diode D6 in a feedback path FP to the input of transistor T1. Now when the third negative pulse appears across resistor R0, transistor T6 will be extinguished and diode D5 will be biased positive through resistor R5. Transistor T5 will conduct. The discharge of capacitor 276 will then extinguish transistor T1 causing transistor T2 to become conductive. This is the same operating condition as shown in the drawing and as existed at the beginning of the description of the operation of the circuit. Application of a fourth negative pulse across resistor R0 will cause the cycle of operation described above to repeat.

It is important to note that in the counter circuit described, the diodes D1, D3 and D5 perform a gating action. If for example, point *h* is approximately twenty volts positive above ground because transistor T2 is nonconductive, there will be an inverse voltage of twenty volts across the diode D1 and ground. Thus the diode may be regarded as biased in the nonconductive direction by twenty volts. If the negative pulse used across resistor R0 is, for example, minus ten volts, these ten volts can only overcome approximately one-half of the voltage biasing the diode, and no current will flow therethrough. If the point *h* has a low voltage, however, there is no bias voltage across diode D1. Then a negative current can enter the diode and extinguish the associated transistor. Diodes D2, D4 and D6 are not operated like the gating diodes D1, D3 and D5. The diodes D2, D4 and D6 act to prevent the positive charge currents to capacitors 272, 274 and 276 from entering the transistors T3, T5 and T1 respectively. These capacitors are charged through resistors R2, R4 and R6.

*Automatic Signal Ranging*

FIGS. 13, 14 show one of ten identical automatic ranging circuits that in conjunction are required for implementation of this invention. The automatic signal ranging circuitry is based upon the concept that there will be provided for each of the six pulses *a* through *f* received during the aligning signal as many as twenty "slots" for possible intervals of coincidence generated by the frequency source 150. During the occurrence of these slots another alternating potential is generated of the same frequency but having the proper phase with respect to the average signal impulse to insure that the average signal impulse is scanned or "picked up" at the center of its time duration.

Referring to FIGS. 13 and 14 there is shown the receiving relay 160. Every time the armature of this relay moves from either fixed contact to the other the pulse induced in the secondary 302 of transformer TF1 is rectified by driving rectifiers 304 which are arranged in a bridge circuit. A momentary negative pulse cuts off the normally conducting transistors TR3 and TR6. No matter at what time this occurs either a negative or positive gate pulse from one of the ten windings 202 on the multiple phase generator 192, will coincide with the transition of relay 160. In FIGS. 13, 14 it is assumed that winding W1, W11 of generator 192 provides coincidence. If a positive gate pulse received from circuit G1 amplified and inverted by transistor TR1 drives transistor TR2 to cut-off coincident with the transition of relay 160, capacitor CA2 will be charged through diode DI1. If the gate pulse is negative, however, the collector voltage of transistor amplifier TR1 will rise positively aiding the positive bias on the transistor TR2 to maintain conductivity of the normally conducting transistor TR2, but the presence of the inverter TR4 will cut off the normally high positive voltage from the base of transistor TR5. This reduction of positive current to the base element of normally conducting transistor TR5 will mean that it will be momentarily cut off by the negative bias applied by battery BA1. In this case capacitor CA3 will be charged through diode DI1.

When either capacitors CA2 or CA3 are reconnected to ground through transistors TR2, TR3 or TR5, TR6 respectively, the grounded capacitor will negatively pulse its respective counting chain CH1 or CH2. Each chain consists of three bistable flip-flop trigger circuits as described in connection with FIG. 12. Now at the end of the preceding burst of transmission the four hundred character counter 190 of the receiving terminal resets all trigger circuits of chains CH1 and CH2 to the condition shown in the drawing will all lower transistors TR7–TR12 conductive. Diodes D14, D14′, D15, D15′ are then very heavily biased positively but diode D13 or D13′ is unbiased since the transistor from which it gets its bias is conductive. Consequently the negative pulse from the gating circuit G1 in FIG. 13 can only enter diode D13 or D13′ and by cutting off transistor TR7 or TR8 as the case may be, causes the trigger circuit to reverse. This removes the positive bias on diode D14 or D14′ so that the next negative pulse will reverse transistors TR9 or TR10. A third negative coincidence will similarly reverse transistors TR11 or TR12, but coincidences in excess of three will be disregarded as it is believed that a "weight" of three is sufficient for any one gate. Of course, if the signal transitions are being randomly advanced and delayed by fortuitous distortion, then other gates will be coincident with the transitions.

Now if transistor TR7 is made non-conductive, its opposite transistor TR7′ will conduct and the positive bias otherwise saturating transistor TA1 or TA1′ will be reduced to a nominal amount making the normally cut-off transistor TA1 or TA1′ an amplifier so that the A.C. voltage from secondary 306 or 308 of transformer 310 for the alternate gate pulse, will be amplified and impressed on the common busbar BB1. This voltage will in turn be amplified by the common transistor amplifier 312 and along with other voltages from other gating networks will be impressed on the secondary busbar BB2. This voltage will be amplified and "squared" by the summation amplifier and squarer 314, 315, and then differentiated by the capacitor CA4 and resistor 316. The positive pulses will appear on line 318 to drive the multiplex receiving chain through an inverter. The negative pulses will trigger a monostable trigger circuit or unimultivibrator 320 to produce positive pickup PP pulses which will appear on line 321. The pulses PP are shown graphically in FIG. 13.

Figures 15, 15A, 15B, 16, 16A, 16B, 17, 17A, 17B:
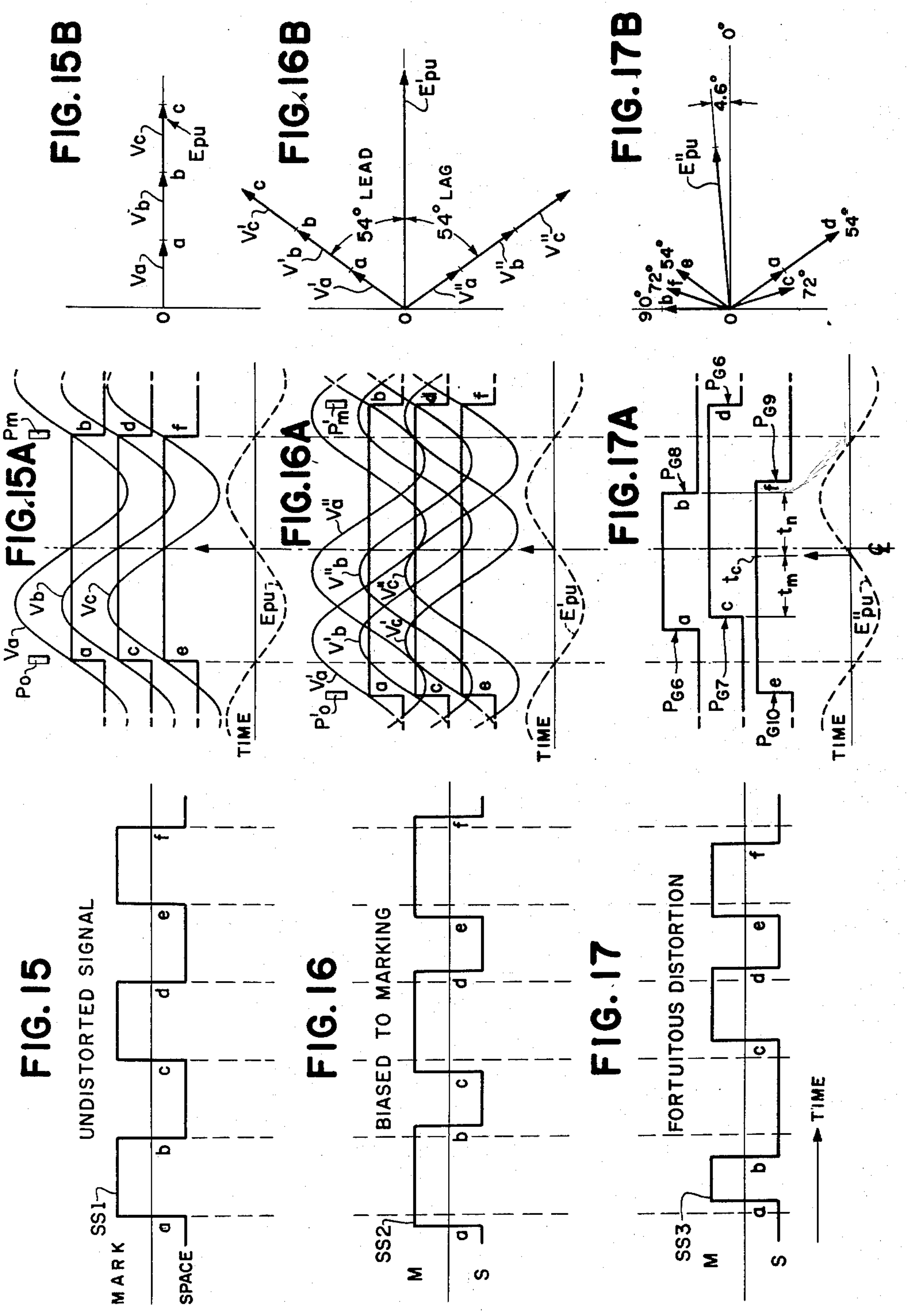

The phase of the resultant voltage at the busbar BB2 will now be considered because it determines the time at which the incoming signal pulses are scanned for purposes of regeneration. FIGS. 15, 16 and 17 illustrate the cumulative effect of the gating and ranging circuitry upon the reception of three different alignment signals *a–f*. In FIG. 15 the alignment signal SS1 is indicated as undistorted for purposes of illustration. All six pulses occur upon the opening of one of the gates G1–G10 of FIG. 10, simultaneously with pulses $P_0$ and $P_m$ during which time generator 192 produces one alternating voltage cycle V as shown graphically in FIG. 15A. Under this signal condition the pulses are counted by the trigger circuits of one counter chain CH1 or CH2. As shown in the vector diagram of FIG. 15B, the resultant pickup voltage $E_{pu}$ appearing on busbar BB2 is the sum of the three equal A.C. voltage increments $V_a$, $B_b$ and $V_c$, all of the same phase.

If the alignment signal SS2 is biased to marking as shown in FIG. 16, three increments $V'_a$, $V'_b$ and $V'_c$ corresponding to space-to-mark transitions will fall on a gate pulse $P'_0$ in advance of the undistorted signal transition time, while mark-to-space transitions $V''_a$, $V''_b$, $V''_c$ will arrive on gate pulse $P'_m$ later than normal, as indicated in FIG. 16A. The vector sum $E'_{pu}$ indicated in FIG. 16B will still have a phase angle of zero like vector $E_{pu}$ and pickup will be effected at the center of both spacing and marking pulses. It will be understood that an even number of pulses should be contained in the aligning signal for otherwise a biased signal would produce a pickup voltage vector displaced from zero. The circuit is limited to regenerating a signal having a bias slightly less than 25% of the normal mark or space signal. If the bias is greater the increment vectors tend to cancel each other and fail to produce a resultant pickup voltage at busbar BB2.

FIG. 17 illustrates a condition where the transitions of signal SS3 are assumed shifted by the effects of fortuitous or random distortion. The degree of shift for each transition has been chosen entirely at random, for purposes of illustration. Referring to FIG. 17A, it will be noted that pulse transition *a* is delayed and happens to occur on the pulsing of gate G6 producing pulse $P_{G6}$. Pulse transition *b* is advanced to occur with pulse $P_{G8}$ of gate G8. Pulse transition *c* is delayed and occurs with $P_{G7}$ of gate G7. Pulse transition *d* is delayed and occurs on the next pulsing of gate G6 producing pulse $P_{G6}$. Pulse transition *e* is advanced and occurs on pule $P_{G10}$ of gate G10. Pulse *f* is advanced and occurs on pulse $P_{G9}$ of gate G9.

The range limits are pulse transitions *b* and *c*, the earliest and latest transitions respectively. The range center occurs at time $t_c$ slightly in advance of the true center of undistorted signals (time $t_m$ being equal to time $t_n$ when the range is bisected).

With the automatic ranging circuit in operation the six incremental voltage vectors fall as shown in the vector diagram of FIG. 17B, some lagging the zero phase angle by angles of 72° and 54° and others leading the zero phase angle by 90°, 72° and 54°. The signal transitions *a* and *b* both fall on the same lagging gate pulse $P_{G6}$ and lag the zero phase angle by 54°. When the real and imaginary components of all six vectors are added respectively, resultant $E''_{pu}$ which appears on busbar BB2 is found to also lead the zero axis and to coincide with the range center at time $t_c$. Thus the ranging circuitry provides an effective means of scanning the twenty gate pulses produced by gates G1–1G10 to obtain a resultant output pulse at the center of a series of coincidences of transitions passing through zero voltage of six applied alignment pulses with six of the twenty gates pulses. This resultant pulse is centered in the range of the marking and spacing pulses regardless of signal bias or fortuitous distortion conditions.

The ranging circuit produces an effect which may be termed "electronic clutching." This may be best understood by referring to FIGS. 18 and 19. FIG. 18 shows a conventional sinusoidal oscillator 320 having an output at terminals 322, 323. Switch 324 is connected across the oscillator output in series with resistor 326. If the switch 324 is closed, the voltage $V_r$ appearing across the resistor is in phase with the oscillator output. The phase of the voltage $V_r$ appearing across the resistor 326 is not related to the switching instant but is instead exactly the same as that of the oscillator output. This is indicated in FIG. 19 in which curve $V_0$ represents the simple sinusoidal frequency output of the oscillator at terminals 322, 323 and curve $V_r$ represents the voltage appearing across resistor 326. At the switching instant $T_0$, the voltage $V_r$ occurs and continues exactly in phase with the oscillator voltage $V_0$.

In the ranging circuitry disclosed an important different and novel clutch effect is obtained. There an output is obtained whose phase with respect to the reference frequency depends only on the switching instant. The circuit provides means for obtaining an alternating output having zero amplitude at precisely the switching instant. The circuit provides means for obtaining an alternating output having zero amplitude at precisely the switching instant. The voltage energizing busbar BB2 in the ranging circuit is selected by a signal cross-over or transition which is the equivalent of a switching instant. The signal transition has a choice of twenty voltages generated by generator 192 but selects the one whose zero phase coincides with the transition. Thus as shown in FIG. 19, curve $V_{BB2}$ may represent the voltage energizing busbar BB2. The voltage has zero amplitude at the switching time $T_0$. It differs in phase by time $t_d$ with respect to the standard or reference frequency $V_0$. This phase difference is determined by the time of occurrence of the switching instant. Thus the voltage for energizing busbar BB2 is produced by the automatic ranging circuitry acting as an electronic clutch.

*Timer and Start Signal Counter*

In FIGS. 20 and 21 are shown the circuits of the start signal counter 162 and timer 164 of the receiving terminal. The timer includes a unimultivibrator consisting of two transistors TS1 and TS2. The base of transistor TS1 is connected to the secondary of a transformer TF2 whose primary is in series with the primaries of transformers TF1, TF2, TF3, TRA1 and with the armature 156 of receiving relay 160. Transformer TRA1 is located at the multiplex receiving distributor 170 shown in detail in FIGS. 23–25. Transformer TF1 is in the ranging circuit of FIG. 13. Transistor TS1 is normally conducting and transistor TS2 is normally cut off. The collector of transistor TS1 is connected to the base of transistor TS3 whose collector drives relay RE4. Contact 328 of this relay is connected to contact 330 of relay RE5 in the counter 162. The secondary of transformer TF2 is connected to contacts 332, 334 of a relay RE3. These contacts short the secondary of the transformer when the relay is pulsed via normally nonconductive transistor amplifier TS4 whose base is connected to the collector of a normally conducting transistor amplifier TS4 whose base is connected to the collector of a normally conducting transistor in the fifth trigger circuit TC5 of the decade counter.

The decade counter includes a chain of ten bistable flip-flop trigger circuits TC1–TC10 of the type previously described. Two of these circuits TC1 and TC2 are shown in detail. The remainder of the trigger circuits are shown schematically. They are arranged the same as circuit TC2 with the upper transistor normally conducting and the lower transistor normally cut off. The counter includes the transformers TF3 and TF4.

In operation of the timer and counter circuits, the channel reversals A, B indicated graphically in FIG. 3 are applied from step switch 14 of the sending terminal continuously until the beginning of the starting signal $t_0$. Then two starting signal reversals are applied followed by three full reversals *a–f* designated the alignment signal. This alignment signal is applied while switch 14 is on step S2, S2'. The peaked form of the alignment pulses are representative of the voltages induced in the secondary windings of the five transformers TF1–TF4 and TRA1, energized from the armature 156 of relay 160. Whenever the armature 156 moves from minus contact 158 to plus contact 157 a downward spiked pulse such as 1, 3, *a*, *c*, *e*, as indicated in FIG. 3, will be generated. Whenever the armature 156 moves from plus to minus contacts, an upward spiked pulse as indicated at 2, 4, *b*, *d*, *f* is generated.

It is the function of the timer 164 and counter 162 to disregard single downward pulses and in fact to disregard any series of pulses that do not correspond to pulses 1, 2, 3, 4 arriving in the order and polarity shown. This is to insure that the receiving multiplex system will not be falsely started by accidental "hits" on the telegraph line.

When the receiving terminal has completed one cycle of operation and is at rest, the relays and transistors will be in the condition shown in FIGS. 20, 21. For example, relay RE1 will be operated and the secondary 302 of transformer TF1 will be short-circuited. This prevents the generation of negative impulses and their application to the automatic ranging circuit 168. In a similar manner, relay RE2 grounds the center tap of transformer TRA2 of the distributor 170 so that extraneous pickup impulses are not applied to the signal pickup gates therein and no characters pass through to the multiplex signal translators 174 and 176.

Every time the armature of line relay 160 moves from marking to spacing position, a negative impulse is applied to transistor TS1 of the timer 162. The transistors TS1 and TS2 of the timer constitute a "one-shot" unimultivibrator MV having a time of operation such that it will restore itself partway between the occurrence of pulse 4 and pulse *a* of the alignment signal. The decade counter 162 is capable of being stepped ten times but when the last step occurs further operations cease, so that this counter does not cycle continuously. Now stages TC1, TC3, TC5, TC7 and TC9 of the counter are stepped by operations of the armature of relay 160 from minus to plus contacts, while stages TC2, TC4, TC6, TC8 and TC10 of the counter are stepped by the armature motions in the opposite direction from plus to minus contacts. Whenever a positive potential is applied by the sending terminal to the loop containing the receiving relay 160 shown in FIG. 20, the voltage will rise at the left-hand end of the relay and the armature 156 will move to the left to the plus or "spacing" contacts 157 of the relay.

Now suppose that a single positive spacing pulse is received corresponding to one reversal in the channel reversal period. The multivibrator MV will now operate and the relay RE4 will operate causing a negative charge to be placed on the capacitor 342 connected to armature 344 of the relay.

The single received pulse will also step the decade counter 162 one step. However, when relay RE4 is released the negative charge on capacitor 342 will restore the decade counter to zero again. On the other hand, when the starting signal pulses 1, 2, 3 and 4 are received and during the time the multivibrator 340 is operated, the decade counter will step four places to the upper transistor of stage TC4 and relay RE5 will be operated via transistor TS6. This opens the resetting circuit from relay RE4 and permits the counter to step in response to the alignment signal. On the fifth step of the counter, transistor TS4 operates relay RE3 short-circuiting the input to the multivibrator 340 and taking it out of operation in the circuit.

It will be noted that the operation at the fourth step of the counter which operated relay RE5 also released relay RE1 allowing pulses *a*, *b*, *c*, *e* and *f* to enter the automatic ranging circuit 168. When the counter has reached the tenth step in response to impulse *f*, relay RE6 is operated by transistor TS5. This recloses relay RE1 so that no further pulses can pass to the ranging circuit, releases relay RE2 so that the pickup pulses can pass to the pickup gate circuit in distributor 170 and takes the ground of the receiving distributor 170. The receiving terminal now proceeds to receive and distribute 400 operations of the multiplex system. When 400 operations have been performed, the counter 190 operates relay RE7. This applies negative battery voltage to the decade counter restoring it to zero and in so doing causes relays RE3, RE5 and RE6 to release. This restores all circuits to normal condition as shown in FIGS. 20, 21, in preparation for the transmission of another burst of 400 channel or traffic operations.

*The Four Hundred Operations Counter*

The 400 operations counter 190 of the receiving terminal as shown in FIG. 22 produces a resetting pulse for the entire receiving terminal every time the receiving terminal has completed a period of operation of 400 cycles. The counter consists of four transistorized counting chains CC1–CC4. Two of the chains CC1 and CC3 count from one to five and the other two chains CC2, CC4 count from one to four. The chains are connected in cascade so that if 400 pulses are received at the input 340, a single output pulse will be obtained at output 350. Only the first two stages of one of the counter chains has been shown in full detail. All the other stages in all counter chains are identical. These stages each consists of a flip-flop trigger circuit as described above. Transistors T11–T15 are normally conducting while their companion transistors are normally cut off. The outputs 354, 356, 358 of counter chains CC1–CC3 are connected to the inputs 360, 362, 364 of the next chains CC2–CC4 respectively.

Negative pulses are applied from the receiving multiplex chain via line 397 to the input 340 of chain CC1. This counter steps five times, once for each pulse received. When five pulses have been received, a pulse appears at output 354 which is applied to input 360 of chain CC2. Chain CC1 simultaneously resets to zero and starts counting again. Each time five pulses are applied in succession to chain CC1 it steps chain CC2 one step until this chain has stepped four times. When chain CC2 completes four steps it steps chain CC3 once. Chain CC2 is reset after each four steps. Chain CC3 is reset after each five steps. The stepping of chain CC3 occurs upon completion of each twenty steps of chain CC1. The stepping of chain CC4 in turn is effected on completion of each one hundred steps of chain CC1. Chain CC4 produces one output pulse at the end of four hundred steps of chain CC1 and resets to zero.

When the 400th pulse appears at the output of the counter chain CC4 it cuts off conduction of normally conducting transistor 366 of the one shot multivibrator 368. This multivibrator reversed its conductive state for about twenty milliseconds on the 400th count which causes relay REL1 to operate for the same length of time. The time constant of the multivibrator 368 is determined by the values of resistor 365 and capacitor 369 in the multivibrator. The collector potential of the now conductive transistor 366 is applied to transistor 370 to cause REL1 to operate. The closing of the relay contacts 374 and 376 applies negative battery voltage via line 371 to all stages of the counter resetting each transistor to its original position and setting all stages to zero. At the same time negative battery voltage is applied to other circuits via lines 391–394.

Line 391 is connected to the negative and positive counting chains CH1 and CH2 in the ranging circuit of FIGS. 13 and 14. The negative pulse applied to these chains resets all the transistors therein. It should be noted that the ranging circuitry of the entire system will have ten circuits such as shown in FIGS. 13 and 14 so that there will be twenty chains like chains CH1 and CH2 in the ranging circuitry. Line 391 will be connected to all twenty changes for resetting them exactly as shown for chains CH1 and CH2.

Line 392 will be connected to pulsing busbar PB2 of FIG. 23 so that the negative pulse applied thereto sets all transistors in the distributor chain 380. Line 393 is connected to matrix pulser MP. Line 394 is connected to transistor SGR of start gate SG shown in FIG. 24. The pulses applied via lines 393 and 394 are necessary to take the places of the first and second auxiliary pulses required at steps S401 and S402 of the step switch at the sending terminal. These auxiliary counting pulses are normally obtained from the receiving network and would otherwise be deleted because the receiving distributor chain 170 has been stopped.

Line 395 is connected to contacts 376 of relay REL1 and terminates at relay RE7 of counter 162 to restore this decade counter to zero.

*The Receiving Multiplex Distributor*

The two-channel electronic multiplex distributor 170 is shown in schematic form in FIGS. 23, 24 and 25 taken together. This distributor includes a chain of flip-flop trigger circuits 380 consisting of ten stages of the chain. The outputs of the ten stages of the chain are connected to ten gating circuits GA1–GA5 and GB1 to GB5 in circuit 382. Each of the gating circuits consists of two pairs of transistors. Gates GA1–GA5 are employed for channel A signal distribution. Gates GB1–GB5 are employed for channel B signal distribution. Two pulse storage banks are required for each of the two channels. The storing banks each consists of five pairs of transistors connected as flip-flops. Storage bank SB1 has flip-flop pairs AS1–AS5 connected to a transfer matrix including ten diodes 384 and five transistors TM1–TM5. The matrix has five outputs connected to five flip-flop transistor stages AS1'–AS5' of the second storage bank SB2. The outputs of the latter stages are applied to gate circuits GP in the multiplex to teleprinter signal translator 174 for channel A, shown in FIG. 26. The output of flip-flop DB5 is applied via line 397 to the input of the four hundred step counter 190. Receiving chain busbar PB1 is connected via line 396 to contacts of relays RE6 of counter 162. The primary winding of transformer TRA2 is connected to contacts of relay RE2 of counter 162 via line 398.

The upper transistors of storage bank SB1 are normally nonconductive for spacing pulses and are conductive for marking pulses. The lower transistors are conductive for spacing pulses and are nonconductive for marking pulses. All upper transistors of storage bank SB2 are normally nonconductive while the lower transistors are conductive in the absence of character pulses stored therein. Gate DB1 supplies a pulse over line 385 to the matrix pulser MP to cause the character stored in storage bank SB1 to be transferred to storage bank SB2.

An inverter transistor TN1 is connected to the base of a gating transistor SGL in the start gate SG. A companion gating transistor SGR is connected via line 386 to signal pickup gate DB2. This gate applies an unlocking pulse for translator 174 to the start gate SG. Batteries 388 and 390 are connected to transistors of the gates SG1 and SGR for applying normal bias thereto. Transistors CL1 and CL2 are connected in a flip-flop trigger circuit arrangement of clamp CL for controlling a teleprinter signal multivibrator MMV in the translator 174.

Only the storage banks for channel A have been shown. It will be understood that a duplicate arrangement of two storage banks, matrix, and start gate will be required to receive the mark and space pulses of channel B which appear at signal pickup gates GB1–GB5.

After the aligning signal crossovers have performed their function of establishing the phase of the signal pickup pulses in the ranging circuit 168 as described above, the positive going pulse derivatives appearing on line 318 pulse the inverter TT1 via diode 372. Each positive pulse drives transistor TT1 to conduction for an instant and capacitor CP1 in turn negatively pulses the receiving multiplex transistor distributor chain 380. The pulsing is continuous at the frequency of the standard frequency source 150 but at a phase 180° ahead of the pickup pulses. Each negative pulse causes the chain to step to the right by one stage and so successively opens the right-hand pair of transistors GTR, GTR' in the respective signal pickup gates 382 some appreciable time before the pickup is done.

Now the trigger pair TT2, TT3 respond directly to signal transitions developed by the receiving relay 160 under the stimulus of multiplex signals from the carrier channel. They are necessary to "square up" the relay output and eliminate the armature travel time during which no specific signal polarity can be discerned. Transistors TT2, TT3 in turn determine which one transistor of the pickup pair TT4, TT5 is conductive when the positive pickup pulse is generated by the one-shot multivibrator 320 in FIG. 13 and applied via line 321 to transformer TRA2. The polarity of the transformer TRA2 is so chosen that if the receiving relay 160 moves to marking, the next pickup pulse will drive the busbar BR1 highly negative making all ten upper left-hand transistors GTL, GTL' in the gates GA1–GA5 and GB1–GB5 nonconductive. The gate whose right-hand pair GTR, GTR' has also been made nonconductive by the distributor chain will then positively pulse the respective upper transistor TU in the first storing bank SB1 causing the associated trigger circuit TRC to reverse if required so that the upper unit is conductive. On the other hand, a spacing pulse will flip the trigger circuit the other way. In this way a character or a blank is stored on the first bank of the two storing banks SB1, SB2.

Timing considerations make it necessary to get the information out of each storing bank at once if the signal is to be converted to teleprinter form so the first step of the chain for the next channel is caused to positively pulse a matrix MT under control of the first storing bank SB1. For a blank all five horizontal busbars HB1–HB5 of the matrix are grounded by their respective transistors TM1–TM5, but for a marking pulse the transistor is cut off, and the associated vertical bar is momentarily driven positive. All five vertical bars VB1–VB5 are energized simultaneously and the character is transferred instantly to all five trigger circuits TRC' in the second storing bank SB2. In FIG. 25 these trigger circuits are shown set up for a blank and so the inverter IN1 is biased negatively to cut-off thereby holding the left hand transistor SGL of the start gate SG in a conductive state.

*Multiplex to Teleprinter Signal Translation*

The multiplex or five-unit code characters are translated to the teleprinter signal form by a transistor distributing chain DC, and the necessary gating circuitry, driven by a multivibrator MMV timed to oscillate at twice the frequency of the reversal frequency of the teleprinter signal. Up until the instant the multiplex character is delivered to the second storing bank SB2 a transistor trigger circuit, the multiplex clamp CL holds the multivibrator MMV inoperative, and the teleprinter signal distributor chain DC is quiescent. The instant a character containing one or more marking impulses is delivered to the second storing bank SB2, the inverter TT1 is driven to conduction and the left hand transistor SGL of the start gate SG opens, although the gate itself is still closed because the right hand transistor SGR is still conductive. When the receiving multiplex chain steps into the second pulse of the next character the positive voltage ordinarily fed to the gate is reduced to zero for the duration of one step of the receiving chain. As a consequence the gate opens and the clamp trigger circuit CL reverses, releasing the multivibrator MMV. When its transistor TM2 becomes conductive the capacitor CP1 delivers the first negative pulse of a series to the teleprinter signal distributor chain DC, simultaneously reversing the state of the first two trigger circuits DC1, DC2. The start pair of trigger circuits DC1, DC2 thus prepares the left hand transistor in the start gate GS so that when transistor TM3 in the multivibrator MMV again conducts the start gate GS positively pulses the spacing busbar SPB. Upon the next reversal of the multivibrator MMV the start and first trigger pairs DC1, DC2 reverse and the extreme left hand pair GP1 of transistors in the first signal pulse gate GP is cut off. Now the extreme right hand pair GP2 of this gate are biased either on or off in opposition depending upon whether or not the pulse stored in the first flip-flop TRC' of the second storing bank SB2 is either marking or spacing, and so when transistor TM3 conducts for the second time the center pair of the gate GPC are momentarily made nonconductive. At this instant the desired busbar SPM or SPB is pulsed positively.

After successively pulsing the teleprinter signal busbars at teleprinter signal intervals the seventh pulse delivered from capacitor CP1 begins to set up the stop pulse gate STG, and when capacitor CP2 delivers its seventh pulse to the gate, a positive pulse is applied to the marking busbar SPM. This closes the teleprinter line 177 to the teleprinter 171 via relay drive RD1 shown in FIG. 26. This final positive pulse also resets the teleprinter signal distributor chain DC, resets the second storing bank SB2 to the blank condition, and resets the clamp trigger CL to stop the oscillation of the multivibrator MMV. The translator circuit 174 is now ready to accept another character from the multiplex channel. Of course, a similar translator circuit 176 and relay drive RD2 is needed for teleprinter 173 of the other channel as indicated in FIG. 4.

The output relay drive circuit RD1 is an extension of the teleprinter signal busbars SPM and SPB. It consists of a flip-flop driving two switching transistors ST1, ST2 connected to the differentially wound coils of the polar output relay PR whose armature drives the teleprinter line 177.

The present system employs two novel features of particular importance. One feature is the separation of transmission into periodic bursts of about a minute duration, a length of time sufficiently short to make it permissible to use a free-running oscillator at each sending and receiving terminal to avoid the complexities of phase correction at the receiving terminal. The second feature is the automatic signal ranging employed to insure scanning of the incoming signals at their center of time duration when they are least susceptible to bias and distortion. The system employs transistorized means for funnelling two teleprinter channels through a single transmission facility such as a narrow-band channel (150 cycle spacing) of a standard telegraph carrier system. The system described is entirely self-regulating, requiring no initial or subsequent lining up or adjustment at any time by technical personnel. This telegraph system retains flexibility of operation while accomplishing greater efficiency of use of available frequency spectrum to obtain two channels of communication where but one is now possible.

Although the instantaneous rate of emission of teleprinter signal characters by the receiving terminal is that of the number of operation of the multiplex, the total number of teleprinter character in one burst is still the same as set at the point of origin. Systemic blanks occasionally injected, during which the teleprinter line remains closed, make up the time difference. Consequently, a teleprinter output of a receiving two-channel multiplex can be patched, if desired, to the input of the sending side of another similar system. Such cascading can be continued indefinitely.

The system has been described in terms of two-channel equipment. It is not limited in the number of channels, however, and can be designed to carry a single high speed teleprinter circuit or more than two channels depending on the allowable bandwidth of the interconnecting carrier facility.

What is claimed is:

1. A communications system comprising sending and receiving terminals for message signals, means for generating a series of said message signals at the sending terminal, means for repeatedly interrupting said message signals and generating groups of alternating pulses at the sending terminal, each group of pulses being generated after a burst of a predetermined number of said message signals, receiving means at the receiving terminal responsive to said message signals for recording the same, circuit control means at the receiving terminal responsive to said alignment signals for starting and stopping said receiving means in coordination with the beginning and end of each burst of message signals generated at the sending terminal, each group of said pulses consisting of a fixed number of pulses, an oscillator at the receiving terminal generating fixed frequency cyclic control signals, means in circuit with said oscillator for producing a multiplicity of alternating voltage gate pulses during each cycle of the control signals, means for scanning the gate pulses to obtain an output pulse at the center of a series of coincidences of transitions through zero amplitude of the pulses in each group thereof with a group of the gate pulses, and means for applying said output pulse to said receiving means for starting the same at the instant of starting each burst of message signals.

2. A signal system comprising sending and receiving terminals for message signals, means for generating a series of said message signals at the sending terminal, means for repeatedly interrupting said message signals and generating groups of pulses, counter and timer means at the receiving terminal scanning said signals and pulses and responsive only upon occurrence of said pulses to generate a control pulse, a source of cyclic reference signals at the receiving terminal, means in circuit with said source producing alternating gate pulses during each cycle of the reference signals, coincidence means in circuit with said counter and timer for comparing said gate pulses and each of said groups of pulses to obtain a resultant output pulse at the center of a series of coincidences of transitions through zero amplitude of pulses in each of said groups thereof with an equal number of gate pulses, and receiving means in circuit with said coincidence means operative upon occurrence of said control pulse and resultant pulse to start reception of said message signals at the end of each interruption thereof.

3. An automatically regulated multiplex telegraph system comprising sending and receiving terminals for message signals, a plurality of independent sources of message signals, a multiplex distributor for receiving said message signals in time division multiplexed sequence and transmitting the signals to the receiving terminal, means at the sending terminal for repeatedly interrupting said message signals and generating control signals, each of the control signals being generated after a burst of predetermined number of the multiplexed signals are transmitted to the receiving terminal, receiving means at the receiving terminal receiving the multiplexed message signals, independent signal translators in circuit with said receiving means respectively selecting and passing the message signals of the respective sources, circuit control means at the receiving terminal responsive to said control signals for starting and stopping said multiplex distributor in coordination with beginning and end of each burst of multiplexed message signals, said control signals each consisting of a number of control pulses, ranging circuit means including summation means for scanning said series of pulses to determine their mean time of occurrence when the pulses are least susceptible to distortion during transmission between sending and receiving terminals, a source of cyclic reference signals at the receiving terminal, means for producing a multiplicity of alternating gate pulses during each cycle of the reference signals, said ranging circuit means including means for scanning said gate pulses to obtain an output pulse at the center of a series of coincidences of transitions through zero amplitude of the control pulses with a group of said gate pulses, and means in circuit with said control means and said receiving means for applying the output pulse to the receiving means to start reception of the multiplexed message signals at the end of each interruption thereof.

4. An automatically regulated multiplex telegraph system comprising sending and receiving terminals for message signals, independent sources of message signals, a multiplex distributor for receiving said message signals in time division multiplexed sequence and transmitting the signals to the receiving terminal, means at the sending terminal for repeatedly interrupting said message signals and generating control signals, each of the control signals being generated after a burst of a predetermined number of the multiplexed signals are transmitted to the receiving terminal, receiving means at the receiving terminal receiving the multiplexed message signals, and independent signal translators in circuit with said receiving means respectively selecting and passing the message signals of the respective sources, each of the control signals consisting of a number of alternating control pulses, a source of cyclic reference signals at the receiving terminal, means for producing a multiplicity of alternating gate pulses during each cycle of the reference signals, means for scanning said gate pulses to obtain an output pulse at the mean time of occurrence of a series of coincidences of transitions through zero amplitude of the control pulses with a group of said gate pulses, means in circuit with the scanning means and said receiving means for applying the output pulse thereto to start reception of the multiplexed message signals at the end of each interruption thereof, and counter and timer means at the receiving terminal scanning said multiplexed and control signals and responsive only upon occurrence of said control pulses to generate a control pulse, said counter and timer means being in circuit with said control means for activating said control means only upon occurrence of said control pulse.

5. An automatically regulated multiplex signal system comprising sending and receiving terminals for message signals, a plurality of sources of message signals, a multiplex distributor for receiving said message signals in time division multiplexed sequence and transmitting the signals to the receiving terminal, means at the sending terminal for repeatedly interrupting said message signals and generating control signals, each of the control signals being generated after a burst of a predetermined number of the multiplexed signals are transmitted to the receiving terminal, receiving means at the receiving terminal for receiving the multiplexed message signals, independent signal translators in circuit with said second multiplex distributor respectively selecting and passing the message signals of said source, each of the control signals consisting of a number of alternating control pulses, a source of cyclic reference signals at the receiving terminal, means producing a multiplicity of alternating gate pulses during each cycle of the reference signals, means for scanning said gate pulses to obtain an output pulse at the instant of occurrence of the mean of a series of coincidences of transitions through zero amplitude of the control pulses with a group of said gate pulses, means in circuit with the scanning means and said receiving means for applying said output pulse thereto to start reception of the multiplexed message signals at the end of each interruption thereof, said scanning means including counter and timer means responsive only upon occurrence of said control pulses to generate said output pulse, and a multiple operations counter in circuit with said receiving means and responsive to occurrence of said output pulse to disable said receiving means at the end of each burst of multiplexed signals.

6. An automatically regulated multiplex signal system comprising sending and receiving terminals for pulsating message signals, independent sources of message signals, a multiplex distributor at the sending terminal for receiving said message signals from said sources in time division multiplexed sequence and transmitting multiplexed message pulses to the receiving terminal, means at the sending terminal for repeatedly interrupting said message pulses and generating control signals, each of the control signals being generated after a burst of a predetermined number of the multiplexed pulses are transmitted to the receiving terminal, receiving means at the receiving terminal for receiving the multiplexed pulses, independent signal translators in circuit with said receiving means for respectively selecting and passing message signals corresponding to the message signals of said sources thereof, each of said control signals consisting of a series of control pulses, circuit means at the receiving terminal for scanning each series of control pulses to determine the mean time of occurrence of the control pulses in each series thereof when the control pulses are least susceptible of distortion during transmission between sending and receiving terminals, and control means at the receiving terminal in circuit with said receiving means and said circuit means for starting and stopping said receiving means in coordination with beginning and end of each burst of multiplexed message pulses at times depending on the mean time of occurrence of the control pulses as determined by said circuit means.

References Cited in the file of this patent

UNITED STATES PATENTS

| | | |
|---|---|---|
| 2,615,971 | Malthaner et al. | Oct. 28, 1952 |
| 2,769,030 | Baker | Oct. 30, 1956 |
| 2,779,933 | Bradburd | Jan. 29, 1957 |
| 2,905,760 | Walker et al. | Sept. 22, 1959 |
| 2,923,820 | Liguori et al. | Feb. 2, 1960 |
| 3,022,375 | Davey | Feb. 20, 1962 |

FOREIGN PATENTS

| | | |
|---|---|---|
| 166,485 | Australia | Jan. 6, 1956 |

OTHER REFERENCES

Kaufman: Introduction to Color T.V., New York, J. F. Rider, 1954, schematic back insert, TK 6670K3.